(12) United States Patent
Liu

(10) Patent No.: US 11,779,845 B2
(45) Date of Patent: Oct. 10, 2023

(54) INFORMATION DISPLAY METHOD AND APPARATUS IN VIRTUAL SCENE, DEVICE, AND COMPUTER-READABLE STORAGE MEDIUM

(71) Applicant: Tencent Technology (Shenzhen) Company Limited, Guangdong (CN)

(72) Inventor: Zhihong Liu, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/950,533

(22) Filed: Sep. 22, 2022

(65) Prior Publication Data
US 2023/0013663 A1 Jan. 19, 2023

Related U.S. Application Data

(63) Continuation of application No. PCT/CN2021/112290, filed on Aug. 12, 2021.

(30) Foreign Application Priority Data

Sep. 30, 2020 (CN) .......................... 202011057311.3

(51) Int. Cl.
*A63F 13/56* (2014.01)
*A63F 13/52* (2014.01)
(Continued)

(52) U.S. Cl.
CPC .............. *A63F 13/56* (2014.09); *A63F 13/52* (2014.09); *A63F 13/5375* (2014.09);
(Continued)

(58) Field of Classification Search
CPC ...... A63F 13/56; A63F 13/52; A63F 13/5375; A63F 13/5378; A63F 2300/305; A63F 2300/8076
(Continued)

(56) References Cited

U.S. PATENT DOCUMENTS 10,183,222 B2 * 1/2019 Tsui ...................... A63F 13/837
10,843,089 B2 * 11/2020 Sullivan .................. A63F 13/87
(Continued)

FOREIGN PATENT DOCUMENTS

CN 107694089 A 2/2018
CN 108144293 A 6/2018
(Continued)

OTHER PUBLICATIONS

International Search Report and Written Opinion dated Nov. 11, 2021 in International Application No. PCT/CN2021/112290 with English Translation (11 pages).
(Continued)

*Primary Examiner* — Allen Chan
(74) *Attorney, Agent, or Firm* — ARENTFOX SCHIFF LLP

(57) ABSTRACT

An information display method in a virtual scene is provided. In the method, the virtual scene that includes a first virtual object is displayed. The first virtual object is controlled to move in the virtual scene based on a user input. Further, in response to the first virtual object moving into a target region in the virtual scene and obtaining control authority of the target region, a graphical representation of each of at least one second virtual object in the virtual scene is displayed based on a perspective of the first virtual object in the virtual scene. When a view of the respective second virtual object from a location of the first virtual object is obstructed, the graphical representation of an obstructed portion of the respective second virtual object is displayed in the virtual scene based on the perspective of the first virtual object and a position of the respective second virtual object in the virtual scene.

20 Claims, 13 Drawing Sheets

(51) Int. Cl.
*A63F 13/5375* (2014.01)
*A63F 13/5378* (2014.01)

(52) U.S. Cl.
CPC .... *A63F 13/5378* (2014.09); *A63F 2300/305* (2013.01); *A63F 2300/8076* (2013.01)

(58) Field of Classification Search
USPC .......................................................... 463/31
See application file for complete search history.

(56) References Cited

U.S. PATENT DOCUMENTS

| | | | |
|---|---|---|---|
| 11,471,768 B2* | 10/2022 | Chan | A63F 13/822 |
| 2012/0270653 A1 | 10/2012 | Kareemi et al. | |
| 2014/0038708 A1* | 2/2014 | Davison | A63F 13/69 |
| | | | 463/31 |
| 2019/0118078 A1 | 4/2019 | Li | |

FOREIGN PATENT DOCUMENTS

| | | |
|---|---|---|
| CN | 109847353 A | 6/2019 |
| CN | 110109726 A | 8/2019 |
| CN | 111185004 A | 5/2020 |
| CN | 111228790 A | 6/2020 |
| CN | 111265861 A | 6/2020 |
| CN | 111338534 A | 6/2020 |
| CN | 112121430 A | 12/2020 |
| EP | 2952233 A1 | 12/2015 |

OTHER PUBLICATIONS

Chinese Office Action dated Oct. 11, 2021 in Application No. 202011057311.3 with Concise English Translation (13 pages).

* cited by examiner

INFORMATION DISPLAY METHOD AND APPARATUS IN VIRTUAL SCENE, DEVICE, AND COMPUTER-READABLE STORAGE MEDIUM

RELATED APPLICATIONS

The present application is a continuation of International Application No. PCT/CN2021/112290 filed on Aug. 12, 2021, which claims priority to Chinese Patent Application No. 202011057311.3 filed on Sep. 30, 2020. The entire disclosures of the prior applications are hereby incorporated by reference in their entirety.

FIELD OF THE TECHNOLOGY

This application relates to the field of computer technologies, including an information display method and apparatus in a virtual scene, a device, and a computer-readable storage medium.

BACKGROUND OF THE DISCLOSURE

A display technology based on graphics processing hardware expands a channel for perceiving environment and obtaining information. Especially, a display technology of a virtual scene can implement diverse interactions between virtual objects controlled by a user or artificial intelligence according to an actual application requirement, and has various typical application scenarios. For example, in virtual scenes of combat style simulations, games, and the like, the technology can simulate a real battle process between virtual objects.

Due to randomness of layout of the virtual scene and diversity of a movement route of the virtual object, the interaction between the virtual objects is random. In order to achieve full interaction, a prop for viewing other virtual objects in the virtual scene is provided in the related art, such as a small map, but such a small map is often resident in a display region, which consumes additional graphics computing resources of a computer device.

SUMMARY

Embodiments of this disclosure include an information display method and apparatus, a device, and a non-transitory computer-readable storage medium, and can implement immersive information perception in the virtual scene in an efficient and low resource consumption manner for example.

Technical solutions in the embodiments of this disclosure may be implemented as follows:

In an aspect of the present disclosure, an information display method in a virtual scene is provided. In the method, the virtual scene that includes a first virtual object is displayed. The first virtual object is controlled to move in the virtual scene based on a user input. Further, in response to the first virtual object moving into a target region in the virtual scene and obtaining control authority of the target region, a graphical representation of each of at least one second virtual object in the virtual scene is displayed based on a perspective of the first virtual object in the virtual scene. When a view of the respective second virtual object from a location of the first virtual object is obstructed, the graphical representation of an obstructed portion of the respective second virtual object is displayed in the virtual scene based on the perspective of the first virtual object and a position of the respective second virtual object in the virtual scene.

In an aspect of the present disclosure, an information display apparatus is provided. The information display apparatus includes processing circuitry that is configured to display a virtual scene that includes a first virtual object. The processing circuitry is configured to control the first virtual object to move in the virtual scene based on a user input. The processing circuitry is configured to, in response to the first virtual object moving into a target region in the virtual scene and obtaining control authority of the target region, display a graphical representation of each of at least one second virtual object in the virtual scene based on a perspective of the first virtual object in the virtual scene. When a view of the respective second virtual object from a location of the first virtual object is obstructed, the graphical representation of an obstructed portion of the respective second virtual object is displayed in the virtual scene based on the perspective of the first virtual object and a position of the respective second virtual object in the virtual scene.

The embodiments of this disclosure provide an electronic device. The electronic device includes a memory, configured to store executable instructions; and a processor, configured to implement the information display method in a virtual scene provided in the embodiments of this disclosure when executing the executable instructions stored in the memory.

The embodiments of this disclosure provide a non-transitory computer-readable storage medium storing instructions which when executed by a processor cause the processor to perform the information display method in a virtual scene provided in the embodiments of this disclosure.

The embodiments of this disclosure may have the following beneficial effects:

Information of other virtual objects in the virtual scene is obtained by displaying at least one second virtual object blocked by the item in the virtual scene in the perspective manner, so that people can have a good feeling and awareness for a virtual environment created and displayed by a computer system, an image computing resource for displaying a small map is saved, and computing consumption caused by displaying the small map is reduced. A perspective function is triggered by controlling the first virtual object to move to the target region in the virtual scene, so that effect of efficiently perceiving virtual object information in the virtual scene is implemented, thereby improving a real-time performance of human-computer interaction in the virtual scene.

DESCRIPTION OF EMBODIMENTS

Figure 1:
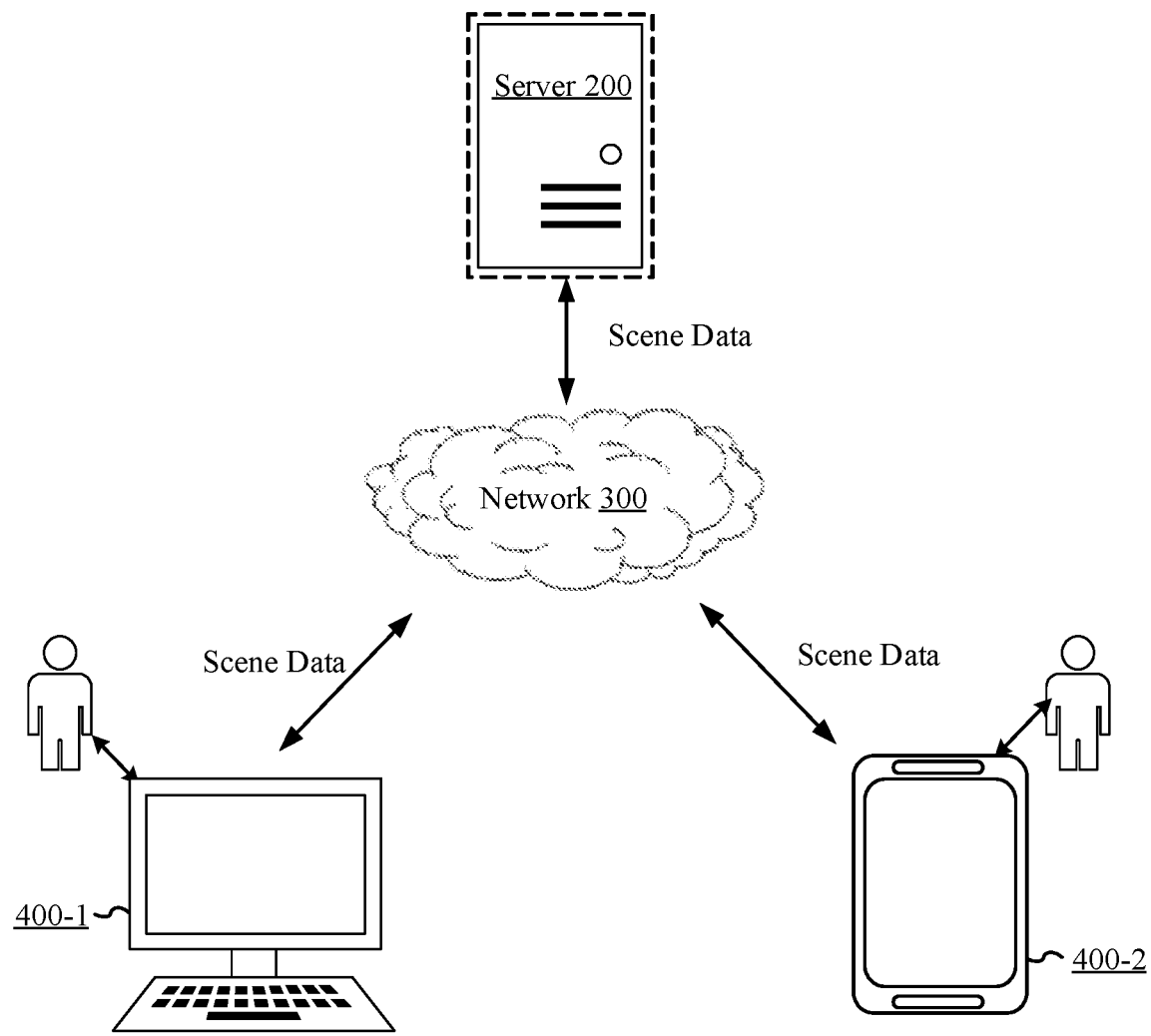
FIG. 1 is a schematic diagram of an implementation scenario of an information display method in a virtual scene according to an embodiment of this disclosure.

To make objectives, technical solutions, and advantages of this disclosure clearer, the following describes exemplary embodiments of this disclosure in further detail with reference to the accompanying drawings. The described embodiments are not to be considered as a limitation to this disclosure. Other embodiments are within the scope of this disclosure.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this disclosure described herein can be implemented in a sequence in addition to the sequence shown or described herein.

Unless otherwise defined, meanings of all technical and scientific terms used in this specification are the same as that usually understood by a person skilled in the technical field to which this disclosure belongs. In this disclosure, terms used are merely intended to describe objectives of the specific embodiments, but are not intended to limit this disclosure.

Before the embodiments of this disclosure are further described in detail, a description is made on nouns and terms in the embodiments of this disclosure, and the nouns and terms in the embodiments of this disclosure are applicable to the following explanations.

1) Client may refer to an application running in a terminal for providing various services, such as a video playback client, a game client, and the like.

2) "In response to" may be used for representing a condition or state on which one or more operations to be performed depend. When the condition or state is satisfied, the one or more operations may be performed immediately or after a set delay. Unless explicitly stated, there is no limitation on the order in which the plurality of operations are performed.

3) Virtual scene may refer to a virtual scene displayed (or provided) by an application when run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this disclosure. For example, the virtual scene may include the sky, the land, the ocean, or the like. The land may include environmental elements such as the desert and a city. The user may control the virtual object to move in the virtual scene.

4) Virtual object may refer to an image of various people and items that can interact in the virtual scene, or a movable object in the virtual scene. The movable object may be a virtual character, a virtual animal, a cartoon character, or the like, and may be, for example, a character, an animal, a plant, an oil drum, a wall, or a stone displayed in the virtual scene. The virtual object may be a virtual image used for representing a user in the virtual scene. The virtual scene may include a plurality of virtual objects, and each virtual object has a shape and a volume in the virtual scene, and occupies some space in the virtual scene.

In an example, the virtual object may be a player character controlled through an operation on a client, or may be an artificial intelligence (AI) character set in a virtual scene battle through training, or may be a non-player character (NPC) set in a virtual scene interaction. The virtual object may be a virtual character for performing adversarial interaction in a virtual scene. A quantity of virtual objects participating in the interaction in the virtual scene may be preset, or may be dynamically determined according to a quantity of clients participating in the interaction.

For example, in a shooting game, the user may control the virtual object to descend freely, glide, parachute, or the like in the sky of the virtual scene, or run, jump, crawl, stoop to move forward, or the like on the land, or swim, float, dive, or the like in the ocean. Certainly, the user may further control the virtual object to drive a virtual vehicle to move in the virtual scene. For example, the virtual vehicle may be a virtual car, a virtual aircraft, a virtual yacht, and the like. Herein, the foregoing scene is merely used as an example for description, which is not specifically limited in the embodiments of this disclosure. The user can also control the virtual object to interact with other virtual objects through a virtual prop. For example, the virtual prop may be a throwing virtual prop such as a hand grenade, a cluster grenade, a sticky grenade, and the like, or a shooting virtual prop such as a machine gun, a pistol, a rifle, and the like. This disclosure does not specifically limit a type of virtual prop.

5) Scene data may represent various features that the object in the virtual scene represents during an interaction process. For example, it may include a position of the object in the virtual scene. Certainly, different types of features may be included according to a type of the virtual scene. For example, in a virtual scene of a game, the scene data may include time required to wait (depending on a number of times for which the same function can be used in specific time) when various functions are configured in the virtual scene, and may also represent attribute values of various states of a game character, including, for example, a health point (also referred to as a red amount), a magic value (also referred to as a blue amount), and the like.

FIG. 1 is a schematic diagram of an exemplary implementation scenario of an information display method in a virtual scene according to an embodiment of this disclosure. To support an exemplary application, a terminal (where a terminal 400-1 and a terminal 400-2 are shown as an example) is connected to a server 200 through a network 300. The network 300 may be a wide area network, a local area network, or a combination thereof. Data transmission is implemented by using a radio link.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in the embodiments of this disclosure.

In actual implementation, an application supporting the virtual scene is installed and run on the terminal (for example, the terminal 400-1). The application may be any one of a first-person shooting game (FPS), a third-person shooting game, a multiplayer online battle arena game (MOBA), a virtual reality application, a three-dimensional map program, a combat simulation program, or a multiplayer gunfight survival game. The user uses the terminal to operate the virtual object in the virtual scene to perform an activity. The activity includes, but is not limited to, at least one of adjusting body postures, crawling, walking, running, riding, jumping, driving, picking, shooting, attacking, and throwing. For example, the virtual object is a virtual character such as a simulated character role or a cartoon character role.

In an exemplary scene, a virtual object (a first virtual object) controlled by the terminal 400-1 and a virtual object (a second virtual object) controlled by the terminal 400-2 are in the same virtual scene. The first virtual object may interact with the second virtual object in the virtual scene at this time. In some embodiments, the first virtual object and the second virtual object may be in a hostile relationship. For example, the first virtual object and the second virtual object belong to different teams and organizations, and the virtual objects in the hostile relationship may perform a confrontational interaction on land in a manner of shooting at each other.

In an exemplary scene, when the terminal 400-1 controls the first virtual object, a picture of the virtual scene is presented on the terminal, and the first virtual object is presented in the picture of the virtual scene; in response to a movement operation for the first virtual object, the first virtual object is controlled to move in the virtual scene; and at least one second virtual object blocked by an item in the virtual scene is displayed in a perspective manner, when the first virtual object moves to a target region in the virtual scene and obtains a control authority for the target region.

In actual implementation, the server 200 calculates scene data and sends the calculated scene data in the virtual scene to the terminal, the terminal relies on graphics computing hardware to complete loading, parsing, and rendering of the calculated display data, and relies on graphics output hardware to output the virtual scene to form visual perception. For example, a two-dimensional video frame may be presented on a display screen of a smartphone, or a video frame implementing a three-dimensional display effect is projected on a lens of augmented reality/virtual reality glasses. It may be understood that perception of a form of the virtual scene may be outputted using corresponding hardware of the terminal. For example, a microphone is used for outputting to form auditory perception, and a vibrator is used for outputting to form tactile perception.

The terminal runs a client (for example, a game application in a network version), to perform game interaction with other users by connecting to the server 200. The terminal outputs a picture of the virtual scene. The picture includes the first virtual object, and the first virtual object is a game character controlled by the user, that is, the first virtual object is controlled by a real user, and moves in the virtual scene in response to an operation by the real user for a controller (including a touch screen, a voice control switch, a keyboard, a mouse, a joystick, and the like). For example, when the real user moves the joystick to the left, the first virtual object moves to the left in the virtual scene, and may alternatively remain stationary, jump, and use various functions (such as a skill and prop).

For example, when the user controls the first virtual object to move into a target region through a client running on the terminal 400-1, and the first virtual object obtains a control authority for the target region, at least one second virtual object blocked by an item in the virtual scene is displayed in a perspective manner. The second virtual object is a game character controlled by a user of another terminal (for example, the terminal 400-2).

In an exemplary scenario, in a combat virtual simulation application, a virtual scene technology is used for enabling a trainee to experience a battlefield environment visually and audibly, to be familiar with an environmental characteristic of a region ready to battle, and to interact with an object in a virtual environment through a necessary device. A virtual battlefield environment can be achieved through a corresponding three-dimensional battlefield environment graphics and image library, including a battle background, a battlefield scene, various weapons and equipment, combat personnel, and the like, to create a dangerous and almost real three-dimensional battlefield environment through background generation and image synthesis.

In actual implementation, the terminal (for example, the terminal 400-1) runs the client (for example, a combat simulation program) to conduct combat exercises with another user by connecting to the server 200. The terminal 400 outputs a picture of the virtual scene (for example, a city A). The picture includes the first virtual object, and the first virtual object is a simulated fighter controlled by the user. For example, when the user controls the first virtual object to move into a target region (for example, a certain region in a square B) through the client running on the terminal 400-1, and the first virtual object obtains a control authority for the target region, at least one second virtual object blocked by an item in the virtual scene is displayed in a perspective manner. The second virtual object is a simulated fighter controlled by a user of another terminal (for example, the terminal 400-2).

Figure 2:
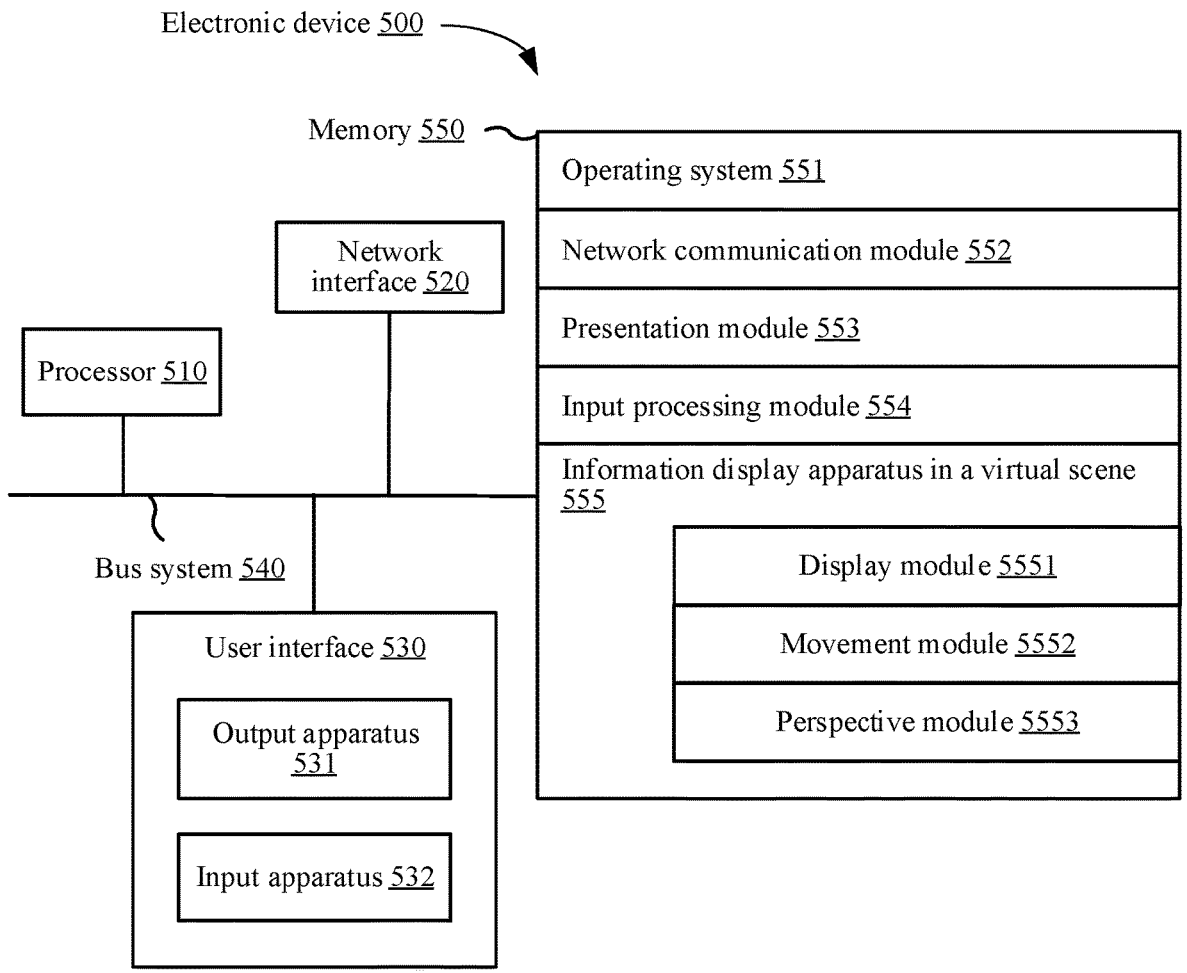
FIG. 2 is a schematic structural diagram of an electronic device 500 according to an embodiment of this disclosure.

FIG. 2 is an exemplary schematic structural diagram of an electronic device 500 according to an embodiment of this disclosure. In an actual application, the electronic device 500 may be the terminal or the server 200 in FIG. 1. Using an example in which the electronic device is the terminal shown in FIG. 1, the following describes a computer device implementing the information display method in a virtual scene according to the embodiments of this disclosure. The electronic device 500 shown in FIG. 2 includes: at least one processor 510, a memory 550, at least one network interface 520, and a user interface 530. All the components in the electronic device 500 are coupled together by using a bus system 540. It may be understood that the bus system 540 is configured to implement connection and communication between the components. In addition to a data bus, the bus system 540 further includes a power bus, a control bus, and a state signal bus. However, for ease of clear description, all types of buses are labeled as the bus system 540 in FIG. 2.

Processing circuitry, such as the processor 510, may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can present media content, including one or more speakers and/or one or more visual display screens. The user interface 530 further includes one or more input apparatuses 532, including a user interface component helping a user input, for example, a keyboard, a mouse, a microphone, a touch display screen, a camera, or another input button and control member.

The memory 550 may be a removable memory, a non-removable memory, or a combination thereof. Exemplary hardware devices include a solid-state memory, a hard disk drive, an optical disc drive, or the like. In an example, the memory 550 includes one or more storage devices physically away from the processor 510.

The memory 550 includes a volatile memory or a non-volatile memory, or may include a volatile memory and a non-volatile memory. The non-volatile memory may be a read-only memory (ROM), and the volatile memory may be a random access memory (RAM). The memory 550 described in the embodiments of this disclosure is to include any other suitable type of memories.

In some embodiments, the memory 550 can store data to support various operations, examples of which include programs, modules, and data structures, or subsets or supersets thereof, as illustrated below.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach another computing device through one or more (wired or wireless) network interfaces 520. Exemplary network interfaces 520 include: Bluetooth, WiFi, a universal serial bus (USB), and the like.

A presentation module 553 is configured to present information by using an output apparatus 531 (for example, a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, the information display apparatus in a virtual scene provided in the embodiments of this disclosure may be implemented by using software. FIG. 2 shows an information display apparatus 555 in a virtual scene stored in the memory 550, which may be software in the form of a program, a plug-in, and the like, and includes the following software modules: a display module 5551, a movement module 5552, and a perspective module 5553. These modules are logical, and therefore can be arbitrarily combined or further split according to the functions implemented.

An exemplary function of each module is described below.

In some other embodiments, the information display apparatus in a virtual scene provided in the embodiments of this disclosure may be implemented by using hardware. For example, the information display apparatus in a virtual scene provided in the embodiments of this disclosure may be a processor in a form of a hardware decoding processor, programmed to perform the information display method in a virtual scene provided in the embodiments of this disclosure. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Next, the following describes the information display method in a virtual scene provided in the embodiments of this disclosure. In actual implementation, the information display method in a virtual scene provided in the embodiments of this disclosure may be implemented by the terminal alone, or may be implemented by the server and the terminal collaboratively.

Figure 3:
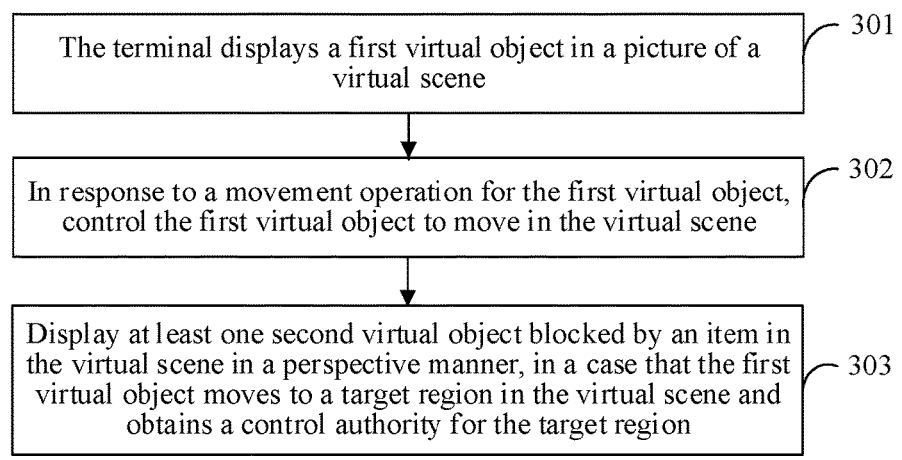
FIG. 3 is a schematic flowchart of an information display method in a virtual scene according to an embodiment of this disclosure.

For example, the method is implemented by the terminal alone. FIG. 3 is a schematic flowchart of an information display method in a virtual scene according to an embodiment of this disclosure, and the description is provided with reference to steps shown in FIG. 3.

In step 301, the terminal displays a first virtual object in a picture of a virtual scene. In an example, a virtual scene that includes a first virtual object is displayed.

In an actual application, an application that supports a virtual scene is installed on the terminal. The application may be any one of a first-person shooting game, a third-person shooting game, a multiplayer online battle arena game, a virtual reality application, a three-dimensional map program, a combat simulation program, or a multiplayer gunfight survival game. The user may use the terminal to operate a virtual object in the virtual scene to perform an activity. The activity includes, but is not limited to: at least one of adjusting body postures, crawling, walking, running, riding, jumping, driving, picking, shooting, attacking, and throwing. For example, the virtual object is a virtual character such as a simulated character role or a cartoon character role.

When the user opens the application on the terminal and the terminal runs the application, the terminal presents a picture of the virtual scene. The picture of the virtual scene is obtained by observing the virtual scene from a first-person object angle of view or from a third-person angle of view. The picture of the virtual scene includes an interactive object and an object interaction environment, such as a first virtual object controlled by a current user.

In step 302, in response to a movement operation for the first virtual object, control the first virtual object to move in the virtual scene. In a example, the first virtual object is controlled to move in the virtual scene based on a user input.

The movement operation for the first virtual object is used for controlling the first virtual object to perform crawling, walking, running, cycling, jumping, driving, and other operations to control the first virtual object to move in the virtual scene. In a moving process, a picture content displayed by the terminal changes with movement of the first virtual object, to display a moving process of the first virtual object in the virtual scene.

In some embodiments, when displaying the moving process of the first virtual object in the virtual scene, the terminal determines a field of view region of the first virtual object according to a position and a field of view angle of the first virtual object in a complete virtual scene, and presents a partial virtual scene in the virtual scene located in the field of view region. That is, the displayed virtual scene may be a partial virtual scene relative to a panoramic virtual scene.

In some embodiments, the terminal may further display a relative position of the first virtual object and the target region in real time, and receive a movement operation for the first virtual object triggered based on the relative position.

The relative position includes an orientation of the target region relative to the first virtual object, and a distance between the target region and the first virtual object, so that the user can trigger the movement operation for the first virtual object according to the displayed relative position, to control the first virtual object to move to the target region.

Figure 4:
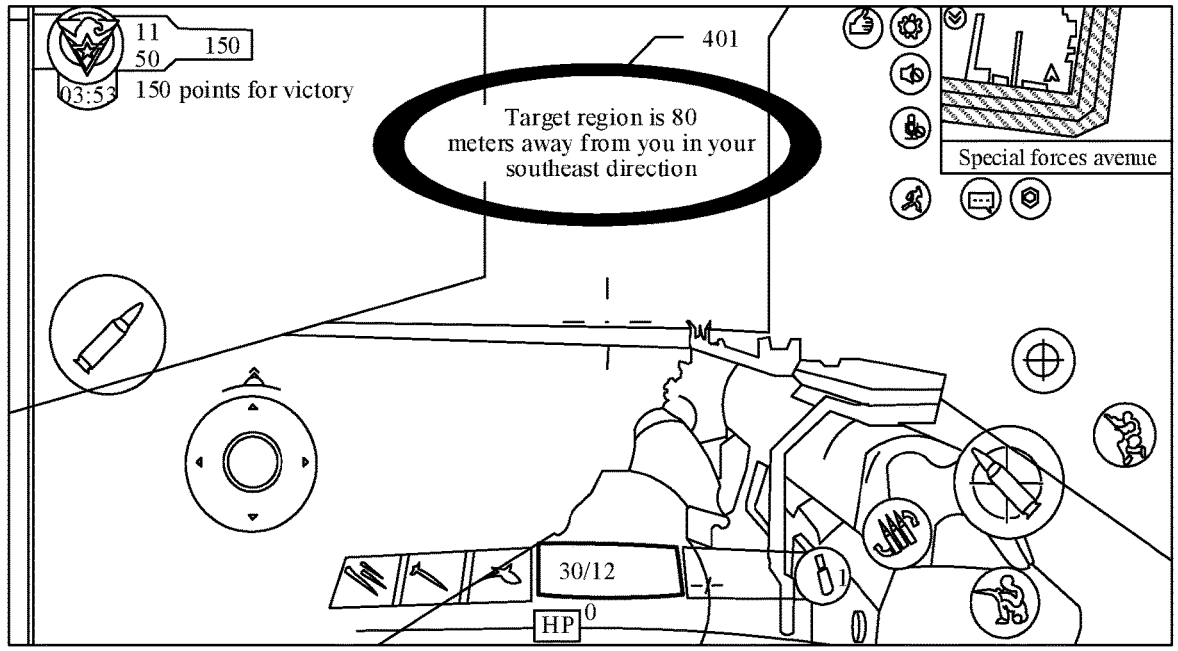
FIG. 4 is a schematic diagram of an interface for presenting a relative position according to an embodiment of this disclosure.

In some embodiments, the relative position may be presented in a text form, to specifically indicate the orientation of the target region relative to the first virtual object, and the distance between the target region and the first virtual object. For example, FIG. 4 is a schematic diagram of an interface for presenting a relative position according to an embodiment of this disclosure. A relative position 401 of the first virtual object and the target region is displayed in a textual manner in an interface of the virtual scene, that is, "the target region is located 80 meters away from you in your southeast direction".

In some embodiments, the relative position may alternatively be presented in a form of a diagram. The diagram includes a distance between the target region and the first virtual object, and an orientation of the diagram is a direction of the target region relative to the first virtual object. A projection point on a screen in a direction that the virtual object faces is used as a center point of the screen. If the diagram is located on a left side of the center point, it indicates that the target region is located at the left front of the virtual object. The user can control the first virtual object to rotate, to adjust a direction that the first virtual object faces. When the center point coincides with the diagram, it indicates that the target region is located directly in front of the virtual object.

Figure 5:
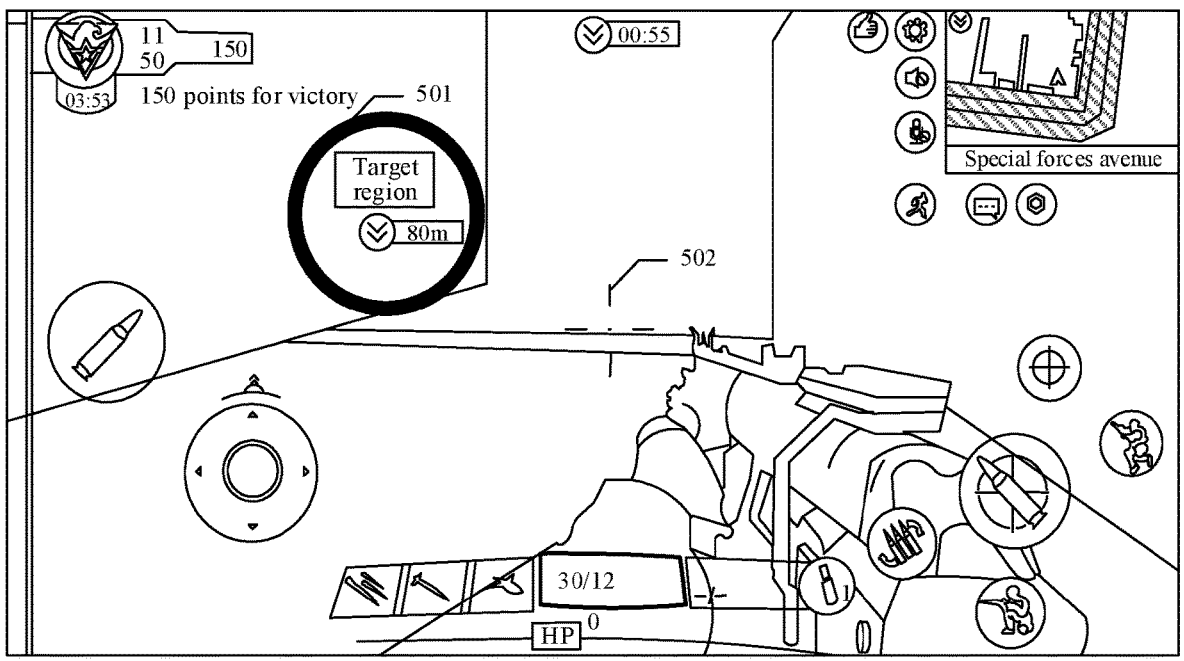
FIG. 5 is a schematic diagram of an interface for presenting a relative position according to an embodiment of this disclosure.

For example, FIG. 5 is a schematic diagram of an interface for presenting a relative position according to an embodiment of this disclosure. A relative position 501 of the first virtual object and the target region is displayed in a diagram manner in an interface of the virtual scene. The diagram includes a distance "80 m" between the target region and the first virtual object, and the diagram is located on a left side of a center point 502, which indicates that the target region is located 80 meters away from first virtual object at the left front of the first virtual object.

In some embodiments, the target region is generated when at least one of the following conditions is met: a display instruction for the target region from the user is received; a duration of the virtual scene exceeds a continuous display duration threshold; a cumulative duration for which the virtual object in the virtual scene is in a non-interactive state exceeds a non-interactive duration threshold; and a cumulative duration for which the virtual object in the virtual scene is in a stationary state exceeds a stationary duration threshold. The virtual object includes the first virtual object and the second virtual object.

As an example, a timing of generating the target region is diverse. For example, the target region in the virtual scene is generated when the display instruction for the target region from the user is received. For example, when the duration of the virtual scene exceeds the continuous display duration threshold, which indicates that a duration after an exercise simulation in combat simulation software or a battle in a game starts exceeds a display duration threshold, the target region in the virtual scene may be generated. For example, when the cumulative duration for which the virtual object is in the non-interactive state exceeds the non-interactive duration threshold, it indicates that a cumulative duration for which a virtual object in an exercise simulation in combat simulation software or a battle in a game does not interact with another virtual object exceeds the non-interactive duration threshold. No interaction for a long time indicates that the virtual object does not interact with another virtual object, that is, the virtual object controlled by the user does not encounter a virtual object belonging to a different group. That is, it is necessary to generate the target region, so that the virtual object that does not encounter the virtual object belonging to the different group for a long time can go to the target region and activate a perspective function. For example, when the cumulative duration for which the virtual object in the virtual scene is in the stationary state exceeds the stationary duration threshold, it indicates that the virtual object does not move for a long time. That is, it is necessary to generate the target region, to stimulate the virtual object that does not move for a long time to go to the target region and activate the perspective function.

It can be seen that, by determining the timing of generating the target region in the virtual scene, if the target region is displayed when the game or the exercise starts, a process of an exercise simulation in the combat simulation software or a battle in the game can be accelerated with highest efficiency, thereby reducing a computing resource utilization rate, and increasing an interaction frequency in the exercise simulation or battle, and quickly completing the exercise simulation or battle. In addition, if the target region is displayed after a certain period of time, a clear comparison of a battle situation may be formed, that is, changes of the battle situation in the exercise simulation or the battle before and after the target region is displayed are compared. Effective exercise data and game data are obtained through the change of the battle situation, so that an influence of the target region on the battle situation is obtained, which is conducive to obtaining an effective strategic analysis result.

In some embodiments, the terminal may further randomly select at least one candidate region from pre-configured at least two candidate regions as the target region; and display a map thumbnail corresponding to the virtual scene, and display position information of the target region in the map thumbnail.

In actual implementation, the candidate region in the virtual scene may be preset in a model of the virtual scene, and may be set according to combat simulation logic or game logic. A specific position of the virtual scene is used as a position of the candidate region. For example, the middle of a valley is used as the candidate region, and the end of a street is used as the candidate region. Then, when the target region needs to be generated, one or more of these candidate regions are randomly selected as the target region; and the position information of the target region is displayed in the map thumbnail, so that the user can know that the target region is generated and the position information of the target region according to the position information of the target region displayed in the map thumbnail, to control the virtual object to move based on the position information.

In some embodiments, the terminal may further select at least one candidate region from at least two candidate regions as the target region according to a position of each virtual object in the virtual scene. At least one refers to one or more.

For example, a candidate region is selected from a plurality of candidate regions as the target region, so that costs of reaching the target region for several virtual objects in the virtual scene are close. Therefore, an exercise simulation of the combat simulation software or a battle in the game is more stalemate and balanced and in line with an actual combat scenario, so that battle data finally obtained is of practical value. Alternatively, a plurality (for example, three) of candidate regions closest to a position of the first virtual object are determined from the plurality of candidate regions as the target region, that is, the generated target region facilitates the first virtual object to arrive.

In some embodiments, the terminal may further display the target region and state information of the target region. The state information is used for indicating a controlled state of the target region, and a corresponding control object when the target region is controlled.

The controlled state refers to whether the target region is controlled or not. When the target region is controlled, the corresponding control object may be the first virtual object or the second virtual object. In actual implementation, the state information of the target region may be displayed in a text form or an image form.

For example, when the state information of the target region is displayed in the text form, if the target region is not controlled, state information "the target region is not controlled" is displayed. If the target region is controlled, and the corresponding control object when the target region is controlled is "XX" ("XX" is identification information of the control object, such as a name of the control object), state information "the target region is controlled by XX" is displayed.

When the state information of the target region is displayed in the image form, the target region may be displayed in different display styles, and the different display styles correspond to different state information. For example, the target region may be displayed through a circle in different colors. A region within the circle is the target region, and a color of the circle is used for representing the state information of the target region. For example, white indicates that the target region is not controlled, blue indicates that the target region is controlled by the first virtual object, and red indicates that the target region is controlled by the second virtual object. The first virtual object and the second virtual object may be in a hostile relationship.

Figure 6:
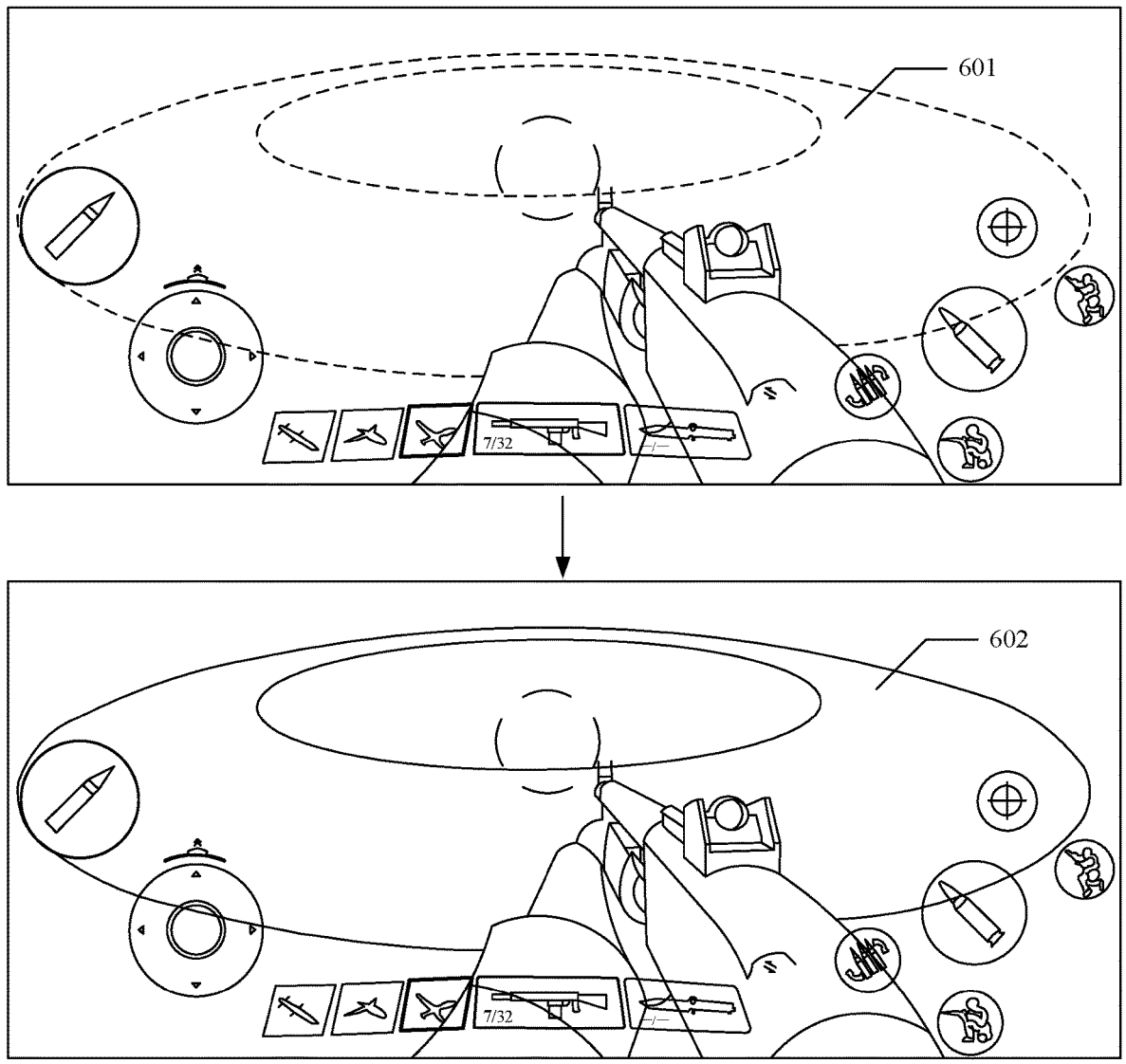
FIG. 6 is a schematic diagram of an interface for displaying a target region according to an embodiment of this disclosure.

As an example, FIG. 6 is a schematic diagram of an interface for displaying a target region according to an embodiment of this disclosure. A range in a circle region 601 and a circle region 602 in FIG. 6 is the target region. The circle region 601 and the circle region 602 use different display styles. The circle region 601 indicates that the target region is not controlled, and the circle region 602 indicates that the target region is controlled by the first virtual object.

In step 303, display at least one second virtual object blocked by an item in the virtual scene in a perspective manner, when the first virtual object moves to a target region in the virtual scene and obtains a control authority for the target region. In an example, in response to the first virtual object moving into a target region in the virtual scene and obtaining control authority of the target region, a graphical representation of each of at least one second virtual object in the virtual scene is displayed based on a perspective of the first virtual object in the virtual scene. When a view of the respective second virtual object from the location of the first virtual object is obstructed, the graphical representation of an obstructed portion of the respective second virtual object may be displayed in the virtual scene based on the perspective of the first virtual object and a position of the respective second virtual object in the virtual scene.

In actual implementation, when observing from an angle of view of the first virtual object, if a perspective manner is not used, the first virtual object cannot see at least one second virtual object blocked by an item in the virtual scene, and can only see the item that blocks the second virtual object. That is, in a picture obtained by observing from the angle of view of the first virtual object, only the item that blocks the second virtual object is presented. For example, when the second virtual object is blocked by a wall, only the wall that blocks the second virtual object is presented, while the second virtual object that is blocked is not presented, so that the user cannot know a position of the second virtual object that is blocked and a shape of the second virtual object (such as squatting and standing). The at least one second virtual object blocked by the item in the virtual scene is displayed in a perspective manner, which indicates that the second virtual object blocked by the item in the virtual scene is displayed at a region corresponding to the position of the second virtual object in a picture obtained by observing from the angle of view of the first virtual object, to reach an effect that the first virtual object can see the second virtual object through the item that blocks the second virtual object, so that the user can know the position of the at least one second virtual object blocked by the item in the virtual scene, and the shape of the second virtual object.

When the second virtual object blocked by the item in the virtual scene is displayed in the region corresponding to the position of the second virtual object, only an outline of the second virtual object may be displayed, or the complete second virtual object may be displayed, that is, specific texture features of the second virtual object, including a specific appearance, clothing, and the like of the second virtual object may be displayed. A display style of the second virtual object is not limited herein.

In some embodiments, the at least one second virtual object blocked by the item in the virtual scene may be displayed in a perspective manner in the following manners: displaying an outline of the second virtual object blocked by the item on a surface of the item in the virtual scene.

The surface of the item refers to a surface of the item facing the virtual object. For each second virtual object, when the second virtual object is blocked by at least two items, that is, when there are a plurality of items between the first virtual object and the second virtual object, the outline of the second virtual object is displayed at a surface of the item closest to the first virtual object, to display the at least one second virtual object blocked by the item in the virtual scene in a perspective manner.

Figure 7:
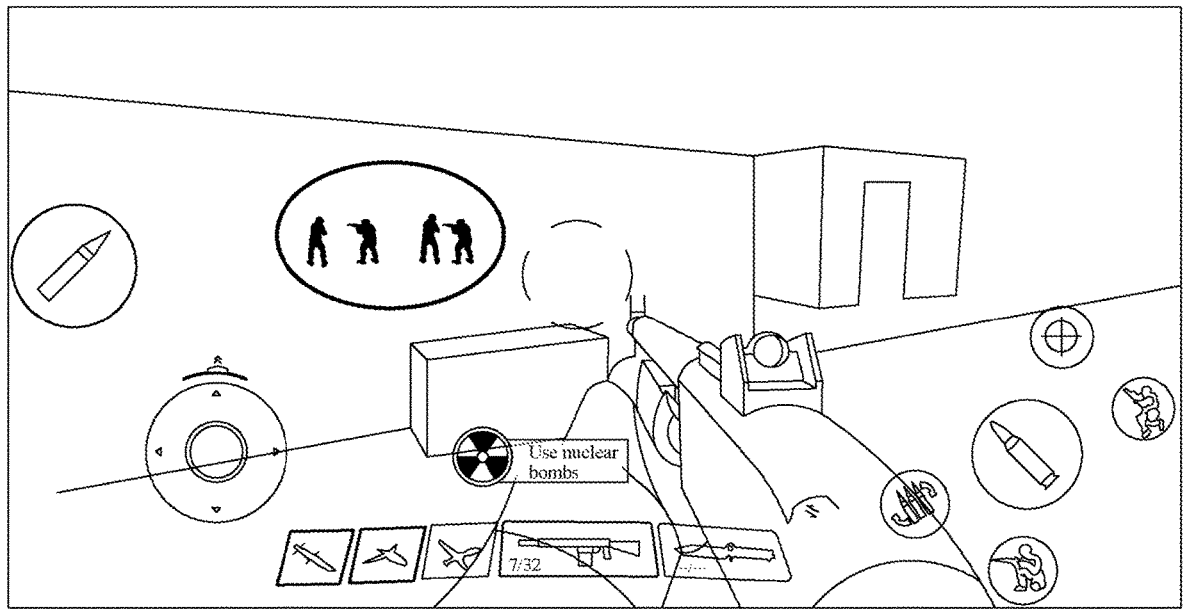
FIG. 7 is a schematic diagram of an interface for displaying a second virtual object according to an embodiment of this disclosure.

For example, FIG. 7 is a schematic diagram of an interface for displaying a second virtual object according to an embodiment of this disclosure. Referring to FIG. 7, outlines of four second virtual objects blocked by a wall are displayed on the wall, and the shapes of the second virtual objects can be clearly determined through the outlines, to determine an operation being performed by the second virtual object, such as shooting, squatting, and the like.

In actual implementation, the outline of the second virtual object blocked by the item that is displayed on the surface of the item in the virtual scene changes with a behavior of the second virtual object. That is, a position at which the outline of the second virtual object is displayed moves according to a movement of the second virtual object, and the shape of the second virtual object represented by the outline also changes according to a current shape of the second virtual object.

In some embodiments, a size of the outline may further be determined according to a distance between the second virtual object and the first virtual object. The outline of the second virtual object may be displayed according to the size of the determined outline. For example, the further the first virtual object is away from the second virtual object, the smaller the size of the outline is, so that the user can know the distance between the second virtual object and the first virtual object.

In some embodiments, the position of the outline of the second virtual object displayed on the surface of the item may be determined in the following manners: determining a connecting line between the first virtual object and the second virtual object. A position corresponding to a point where the connecting line and the surface of the item intersect is a position where the outline of the second virtual object is displayed.

In some embodiments, the at least one second virtual object blocked by the item in the virtual scene may be displayed in a perspective manner in the following manners: displaying the item in the virtual scene with target transparency, and displaying the at least one second virtual object through the item.

In actual implementation, the item in the virtual scene may be displayed with target transparency, so that the at least one second virtual object blocked by the item can pass through the item to be displayed in a picture obtained by observing from the angle of view of the first virtual object. The second virtual object is a complete virtual object, rather than just an outline. The target transparency may be zero or a non-zero value. For example, the target transparency can be set to a small value, to display at least one second virtual object blocked by the item in a perspective manner. In addition, corresponding to different transparency, visibility presented by the second virtual object is different. For example, the transparency of the item that blocks the second virtual object is 10%, and the visibility of the second virtual object is 90%.

Figure 8:
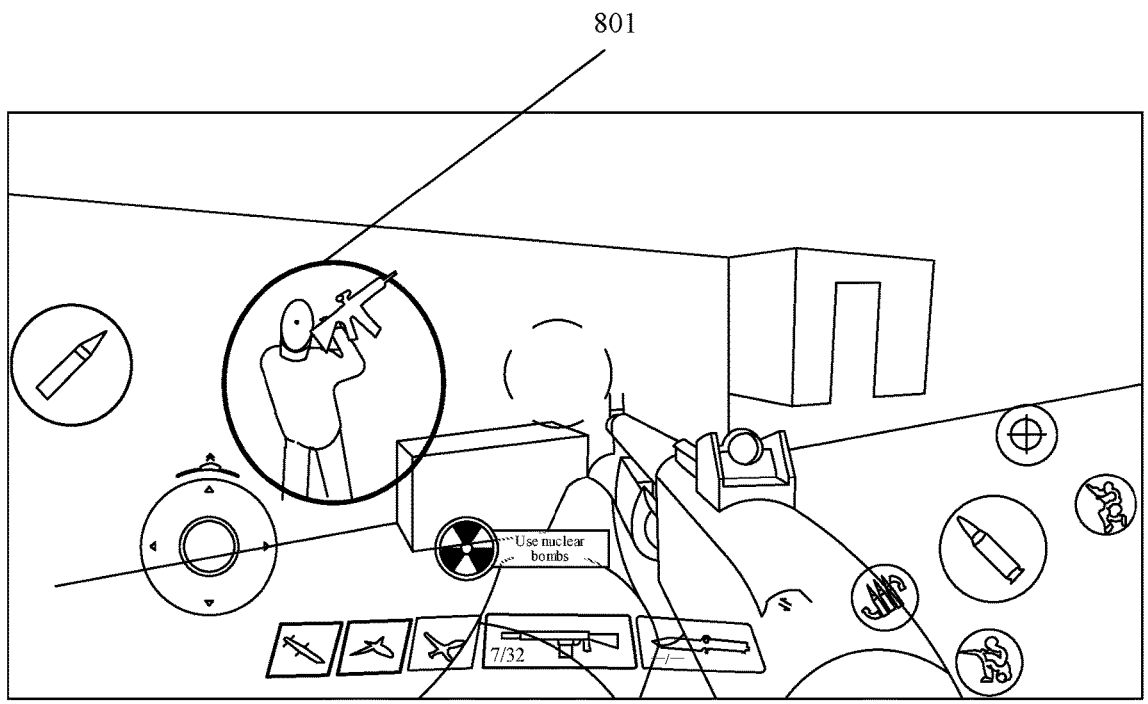
FIG. 8 is a schematic diagram of an interface for displaying a second virtual object according to an embodiment of this disclosure.

As an example, FIG. 8 is a schematic diagram of an interface for displaying a second virtual object according to an embodiment of this disclosure. Referring to FIG. 8, the transparency of the wall is 0, the visibility of the second virtual object is 100%, and a complete second virtual object 801 is displayed through the wall.

In some embodiments, a quantity of second virtual objects that are blocked may be at least two, that is, at least two second virtual objects that are blocked by the item in the virtual scene are displayed in a perspective manner.

In some embodiments, when the quantity of second virtual objects blocked by the item in the virtual scene is at least two, one or more of the second virtual objects may be displayed in a perspective manner. That is, only part of the second virtual objects that are blocked are displayed in a perspective manner. Alternatively, all the second virtual objects that are blocked may be displayed in a perspective manner.

In actual implementation, when at least two of the plurality of second virtual objects blocked by the item in the virtual scene are displayed in a perspective manner, at least two second virtual objects may be randomly selected to display, or at least two second virtual objects nearest to the first virtual object may be selected to display according to the distances between the second virtual objects and the first virtual object. The selection may alternatively be performed in other manners, which is not limited herein. The quantity of second virtual objects selected may be fixed, such as preset a selected quantity, or may be variable, such as determined according to a quantity of remaining second virtual objects, or determined according to a game process.

In some embodiments, that the first virtual object obtains the control authority for the target region may be determined in the following manner: displaying a staying duration of the first virtual object in the target region when the first virtual object moves to the target region of the virtual scene; and determining that the first virtual object obtains the control authority for the target region when the staying duration of the first virtual object in the target region reaches a duration threshold.

In actual implementation, when the first virtual object moves to the target region of the virtual scene, timing of the staying duration of the first virtual object in the target region is started, and the staying duration of the first virtual object in the target region displayed. In a process that the first virtual object stays in the target region, the staying duration changes in real time, so the displayed staying duration also changes in real time.

In actual application, the staying duration may be displayed in a form of a numerical value or a progress bar. When the staying duration is displayed in the form of the numerical value, a process of counting or countdown of the staying duration may be presented. For example, assuming that the duration threshold is 10 seconds, when the first virtual object moves to the target region of the virtual scene, the process of counting the staying duration is displayed, that is, the timing is started from 0 seconds, and it is determined that the first virtual object obtains the control authority for the target region when the timing reaches 10 seconds. Alternatively, when the first virtual object moves to the target region of the virtual scene, a process of counting down the staying duration is displayed, that is, the timing is started from 10 seconds, and it is determined that the first virtual object obtains the control authority for the target region when the timing reaches 0 seconds.

Figure 9:
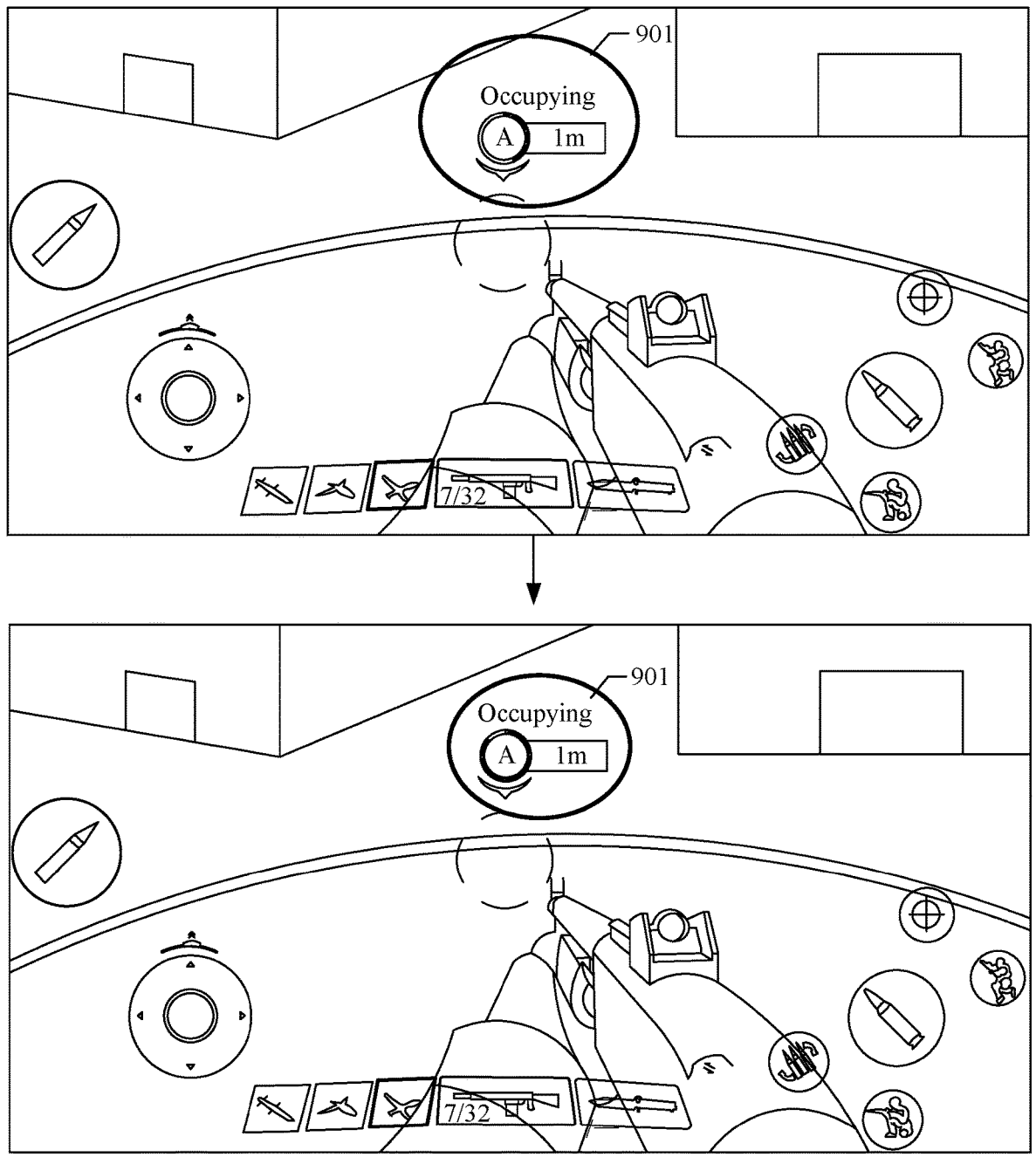
FIG. 9 is a schematic diagram of an interface for presenting a staying duration according to an embodiment of this disclosure.

A case of displaying the staying duration in the form of the progress bar refers to FIG. 9. FIG. 9 is a schematic diagram of an interface for presenting a staying duration according to an embodiment of this disclosure. When the first virtual object moves to the target region of the virtual scene, a progress bar 901 is presented. As the staying duration of the first virtual object in the target region increases, the progress bar increases accordingly. It is determined that the first virtual object obtains the control authority for the target region when the progress bar reaches 100%.

When the staying duration reaches the duration threshold, it is determined that the first virtual object obtains the control authority for the target region. Conversely, if the first virtual object moves out of the target region before the staying duration reaches the duration threshold, the first virtual object does not obtain the control authority for the target region.

If the first virtual object moves out of the target region before the staying duration reaches the duration threshold, when the first virtual object moves into the target region again, the staying duration needs to be timed again from zero.

In some embodiments, that the first virtual object obtains the control authority for the target region may be determined in the following manner: displaying a staying duration of the first virtual object in the target region and a health point of the first virtual object; and determining that the first virtual object obtains the control authority for the target region when the staying duration of the first virtual object in the target region reaches a duration threshold and the health point of the first virtual object is higher than a health point threshold.

In actual implementation, the terminal may further detect the health point of the first virtual object. When the health point of the first virtual object is higher than the health point threshold, it indicates that the first virtual object has ability to control the target region, that is, the first virtual object is not dead or can still fight. When the health point of the first virtual object is not higher than the health point threshold, it indicates that the first virtual object does not have the ability to control the target region, that is, the first virtual object dies or cannot fight. The health point threshold may be zero or a non-zero value (for example, the health point threshold is set to 10 if a total health point is 100).

In actual application, when the health point of the first virtual object is not higher than the health point threshold due to a preemption operation of the second virtual object, the first virtual object loses the ability to control the target region and cannot obtain the control authority for the target region. The preemption operation may be an operation to attack the first virtual object based on various virtual props with tool capabilities.

Figure 10:
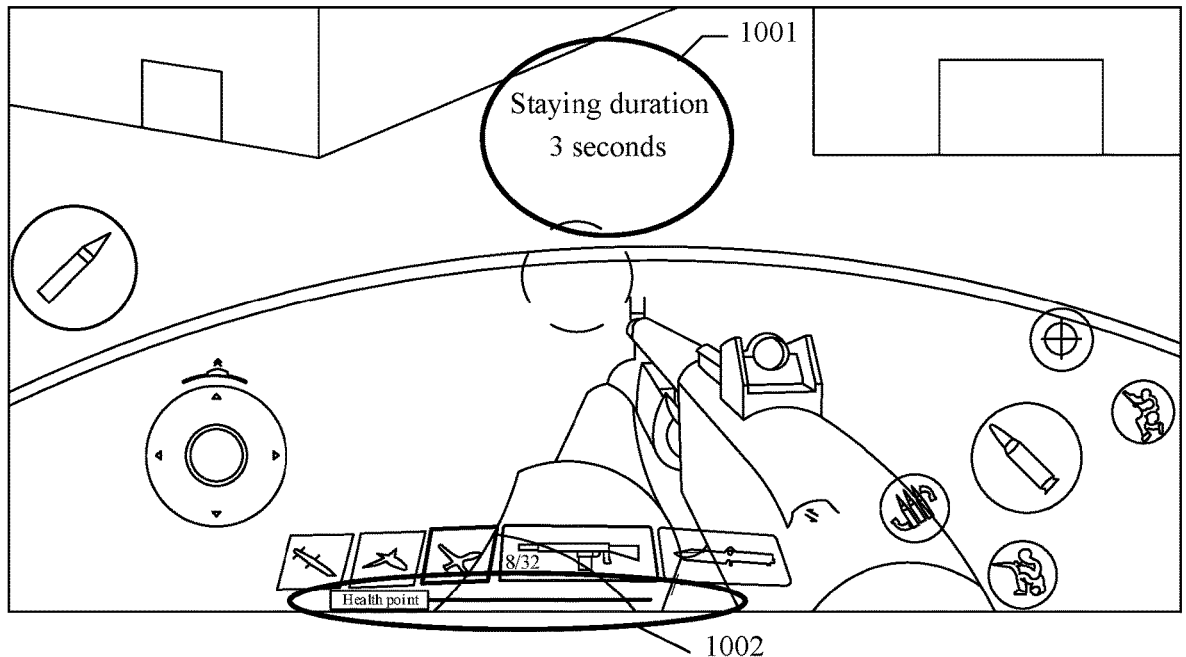
FIG. 10 is a schematic diagram of an interface for presenting a staying duration and a health point according to an embodiment of this disclosure.

As an example, FIG. 10 is a schematic diagram of an interface for presenting a staying duration and a health point according to an embodiment of this disclosure. Assuming that the staying duration threshold is 10 seconds, when the first virtual object moves to the target region of the virtual scene, a staying duration 1001 and a health point 1002 of the first virtual object are displayed. Before the staying duration reaches 10 seconds, if the health point of the first virtual object reaches 0 because the first virtual object is attacked, it is determined that the first virtual object loses the ability to control the target region and cannot obtain the control authority for the target region. If the health point of the first virtual object is greater than 0 during the staying duration from 0 to 10 seconds, it is determined that the first virtual object obtains the control authority for the target region.

In some embodiments, that the first virtual object obtains the control authority for the target region may be determined in the following manner: displaying a quantity of second virtual objects killed by the first virtual object; and determining that the first virtual object obtains the control authority for the target region when the quantity of second virtual objects killed by the first virtual object reaches a quantity threshold.

In actual implementation, when the first virtual object moves to the target region in the virtual scene, the control authority for the target region starts to be contested. In a process of contesting, if the quantity of second virtual objects killed by the first virtual object reaches the quantity threshold, it is determined that the first virtual object obtains the control authority for the target region. If the first virtual object is killed before the quantity of second virtual objects killed by the first virtual object reaches the quantity threshold, or if a quantity of virtual objects killed by the second virtual object reaches the quantity threshold, it is determined that the first virtual object fails to obtain the control authority.

For example, assuming that the quantity threshold is 5, when the first virtual object moves to the target region, and kills five second virtual objects, it is determined that the first virtual object obtains the control authority for the target region.

In some embodiments, when the first virtual object moves to the target region in the virtual scene and obtains the control authority for the target region, the terminal may present prompt information to inform the user to obtain the perspective function, and display the at least one second virtual object blocked by the item in the virtual scene in a perspective manner.

In some embodiments, the terminal may further display identification information of the at least one second virtual object, and a distance between each second virtual object and the first virtual object.

In actual implementation, identification information of the at least one virtual object and the distance between each second virtual object and the first virtual object are displayed, so that the user can accurately determine a position of the second virtual object in combination with the second virtual object displayed in a perspective manner, the identification information of the second virtual object, and the distance between the second virtual object and the first virtual object.

Figure 11:
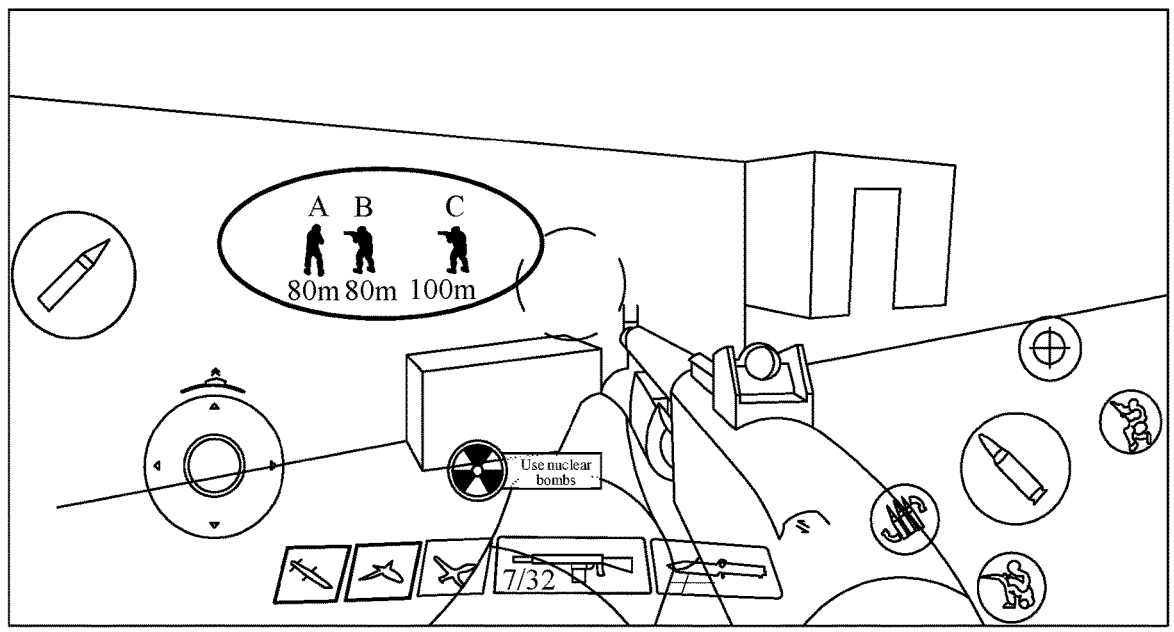
FIG. 11 is a schematic diagram of an interface for displaying a second virtual object according to an embodiment of this disclosure.

For example, the identification information of the second virtual object may be a name of the second virtual object. In this way, the user can clearly and exactly know the position of each second virtual object. FIG. 11 is a schematic diagram of an interface for displaying a second virtual object according to an embodiment of this disclosure. Outlines of three second virtual objects blocked by the wall, names of the three second virtual objects, and distances between the three second virtual objects and the first virtual object are displayed on the wall. It can be seen that a distance between a second virtual object A and the first virtual object is 80 meters, a distance between a second virtual object B and the first virtual object is 80 meters, and a distance between a second virtual object C and the first virtual object is 100 meters. In this way, it can be known that the second virtual object A and the second virtual object B are together.

In some embodiments, the terminal may determine that the second virtual object is blocked by the item in the following manner: determining a connecting line between the first virtual object and each second virtual object; and determining, when the connecting line passes through at least one item, that a corresponding second virtual object is blocked by the item.

Figure 12:
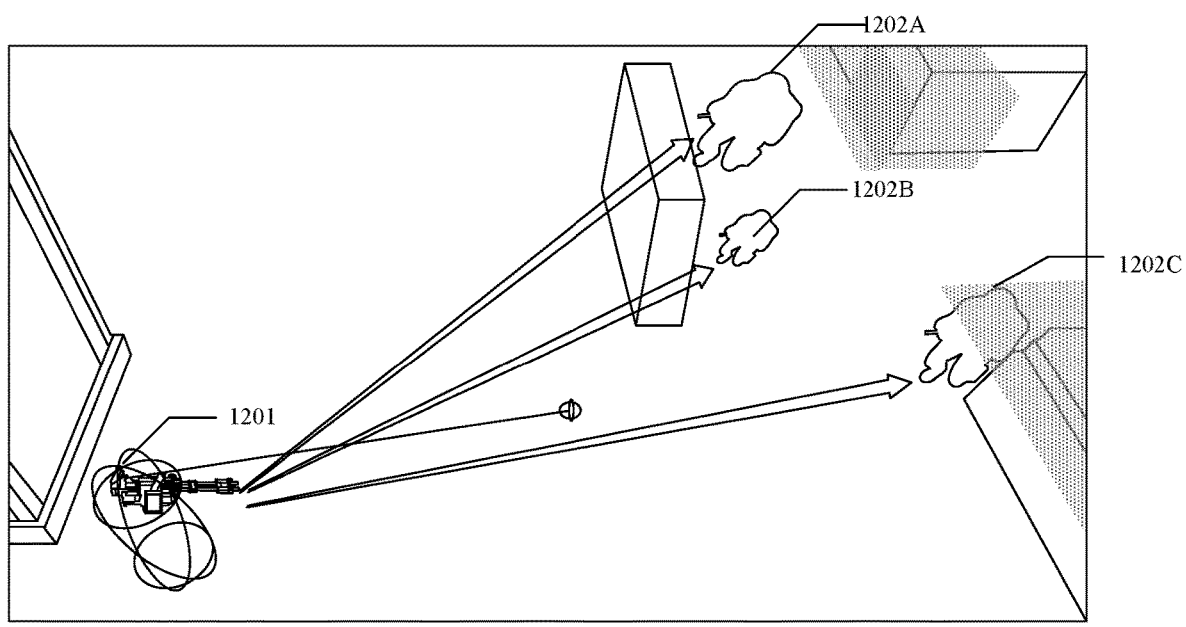
FIG. 12 is a schematic diagram of item detection according to an embodiment of this disclosure.

As an example, FIG. 12 is a schematic diagram of item detection according to an embodiment of this disclosure. FIG. 12 includes a first virtual object 1201 and three second virtual objects, that is, 1202A, 1202B, and 1202C. A connecting line between the first virtual object and each second virtual object is respectively determined. If the connecting line passes through other items, it indicates that the second virtual object is blocked by the item, and the second virtual object needs to be displayed in a perspective manner. If the connecting line does not pass through other items, the second virtual object is displayed in a normal manner.

In some embodiments, the terminal may further cancel the display of the at least one second virtual object blocked by the item in the virtual scene in a perspective manner, when the second virtual object moves to the target region in the virtual scene and obtains the control authority for the target region.

In actual implementation, when the first virtual object obtains the perspective function, that is, when the terminal that controls the first virtual object can display the at least one second virtual object blocked by the item in the virtual scene in a perspective manner, the user that controls the second virtual object can control the second virtual object to move to the target region in the virtual scene, and obtain the control authority for the target region, so that the first virtual object loses the perspective function. In this case, the terminal that controls the first virtual object cancels the display of the at least one second virtual object blocked by the item in the virtual scene in a perspective manner.

As an example, when the first virtual object obtains the perspective function, the user that controls the second virtual object can control the second virtual object to move to the target region through a corresponding terminal, and the perspective function of the first virtual object can be canceled when the staying duration of the second virtual object in the target region reaches the duration threshold. In this case, the terminal that controls the first virtual object cancels the display of the at least one second virtual object blocked by the item in the virtual scene in a perspective manner.

In some embodiments, if no second virtual object moves to the target region in the virtual scene or obtains the control authority for the target region, it is necessary to wait for a duration for which at least one virtual object blocked by the item in the virtual scene is displayed in a perspective manner reaches a target duration, to automatically cancel the display of the at least one second virtual object blocked by the item in the virtual scene in a perspective manner.

According to the embodiments of this disclosure, information of other virtual objects in the virtual scene is obtained by displaying the at least one second virtual object blocked by the item in the virtual scene in a perspective manner, so that a good immersion sense of an object information perception function is implemented, an image computing resource for displaying a small map is saved, and computing consumption caused by displaying the small map is reduced. A perspective function is triggered by controlling the first virtual object to move to the target region in the virtual scene, so that effect of efficiently perceiving virtual object information in the virtual scene is implemented, thereby improving a real-time performance of human-computer interaction in the virtual scene.

Figure 13:
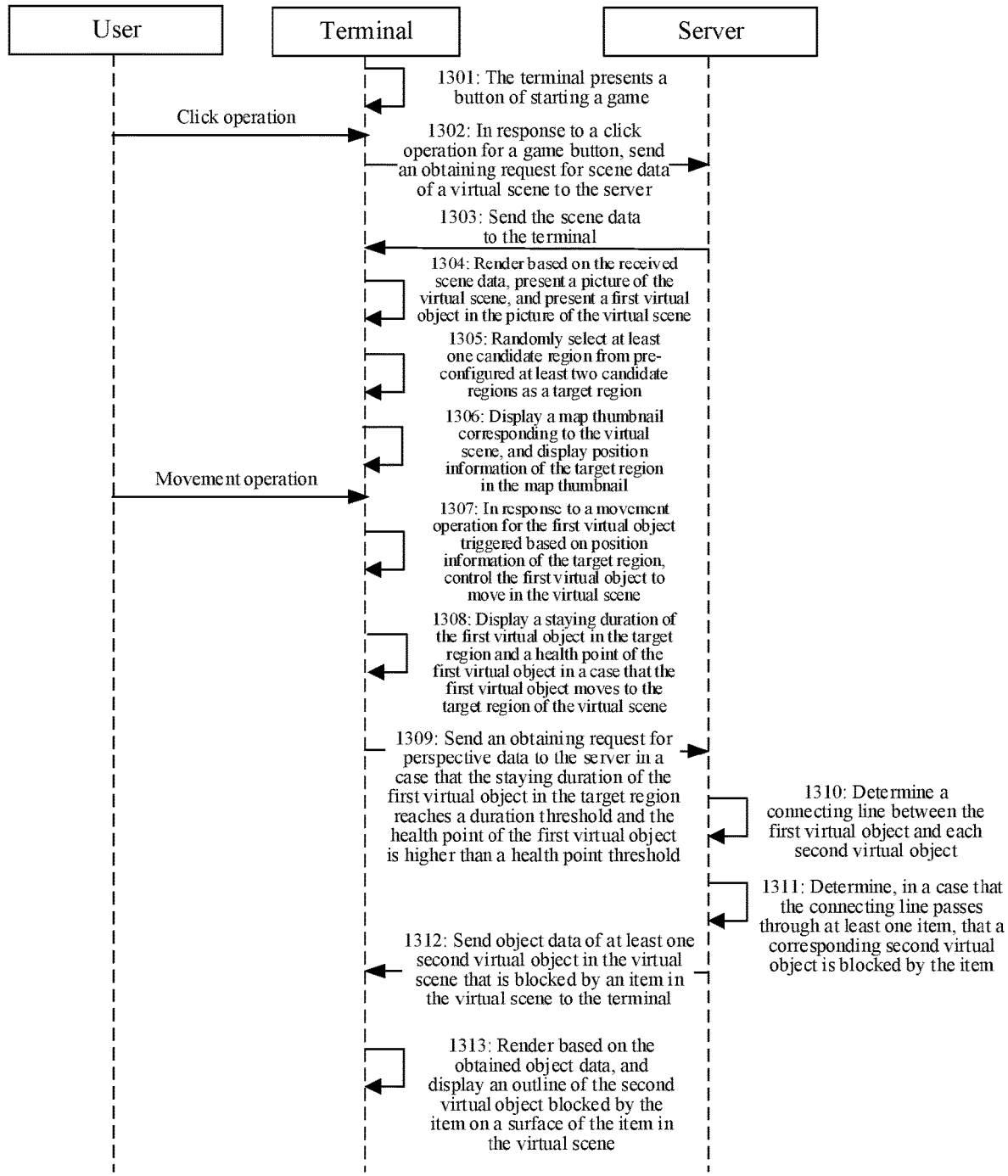
FIG. 13 is a schematic flowchart of an information display method in a virtual scene according to an embodiment of this disclosure.

The following continues to describe the information display method in a virtual scene provided in the embodiments of this disclosure. The information display method in a virtual scene is collaboratively implemented by the terminal and the server. FIG. 3 is a schematic flowchart of an information display method in a virtual scene according to an embodiment of this disclosure. Referring to FIG. 13, the information display method in a virtual scene provided in the embodiments of this disclosure includes:

Step 1301: The terminal presents a button of starting a game.

Step 1302: In response to a click operation for a game button, send an obtaining request for scene data of a virtual scene to the server.

Step 1303: The server sends the scene data to the terminal.

Step 1304: The terminal renders based on the received scene data, presents a picture of the virtual scene, and presents a first virtual object in the picture of the virtual scene.

Step 1305: Randomly select at least one candidate region from pre-configured at least two candidate regions as a target region.

Step 1306: Display a map thumbnail corresponding to the virtual scene, and display position information of the target region in the map thumbnail.

Step 1307: In response to a movement operation for the first virtual object triggered based on position information of the target region, control the first virtual object to move in the virtual scene.

Step 1308: Display a staying duration of the first virtual object in the target region and a health point of the first virtual object when the first virtual object moves to the target region of the virtual scene.

Step 1309: Send an obtaining request for perspective data to the server when the staying duration of the first virtual object in the target region reaches a duration threshold and the health point of the first virtual object is higher than a health point threshold.

Step 1310: The server determines a connecting line between the first virtual object and each second virtual object.

Step 1311: Determine, when the connecting line passes through at least one item, that a corresponding second virtual object is blocked by the item.

Step 1312: The server sends object data of at least one second virtual object in the virtual scene that is blocked by an item in the virtual scene to the terminal.

Step 1313: The terminal renders based on the obtained object data, and displays an outline of the second virtual object blocked by the item on a surface of the item in the virtual scene.

Figure 14:
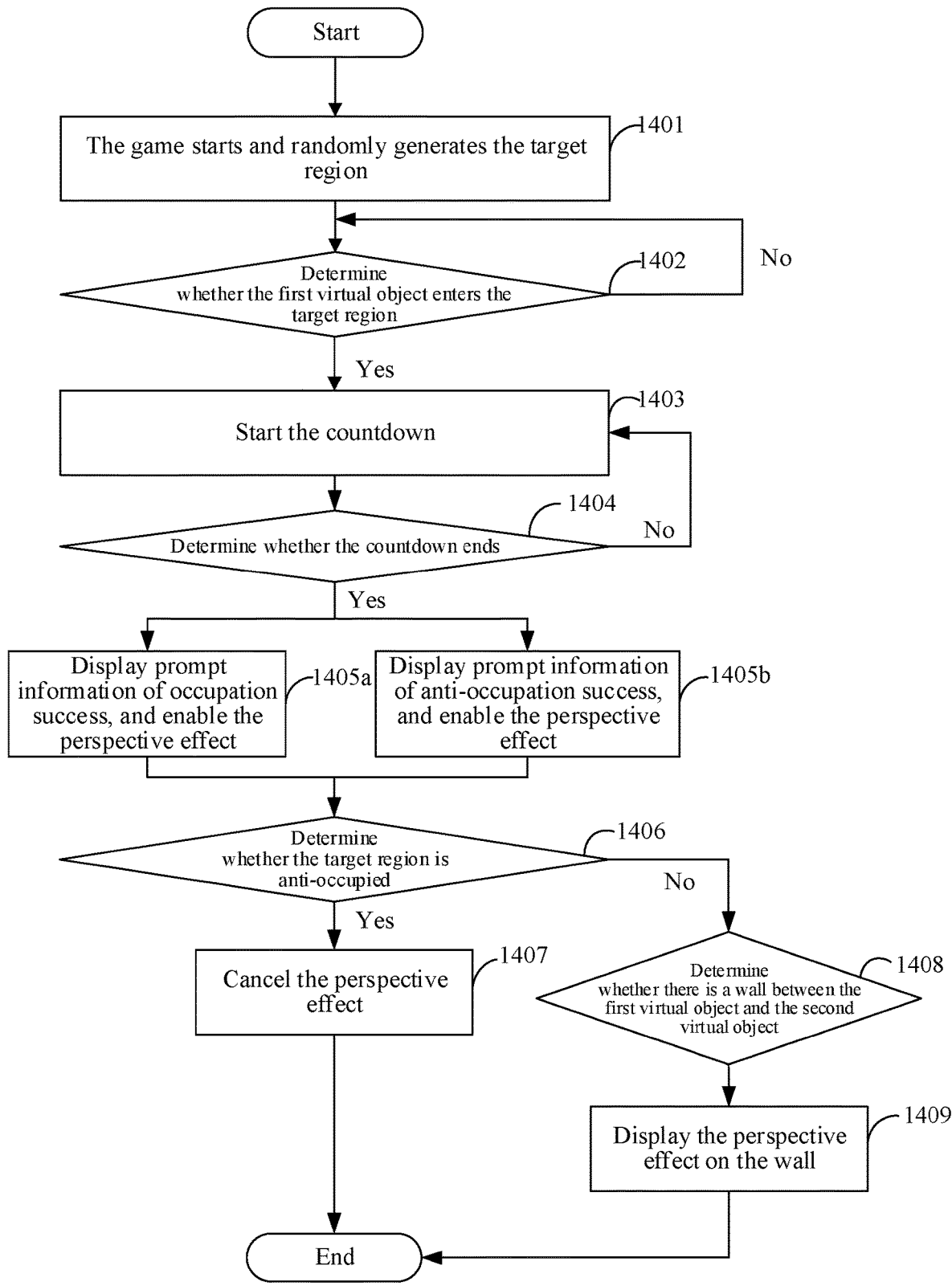
FIG. 14 is a schematic flowchart of an information display method in a virtual scene according to an embodiment of this disclosure.

The following describes an exemplary application of the embodiments of this disclosure in an actual application scenario. FIG. 14 is a schematic flowchart of an information display method in a virtual scene according to an embodiment of this disclosure. Referring to FIG. 14, the information display method in a virtual scene provided in the embodiments of this disclosure includes:

Step 1401: The game starts and randomly generates the target region.

The player selects and enters a target play mode. In the target play mode, a perspective effect can be enabled after the target region is seized. After the game starts for a period of time, the system randomly generates the target region.

Random logic is not to randomly select a region from all places in an entire map as the target region, but to pre-configure several candidate regions, and then randomly select a region from these several candidate regions as the target region.

The target region randomly reappears after each disappearance, that is, a determined target region may be the same as or different from a previously determined target region.

Figure 15:
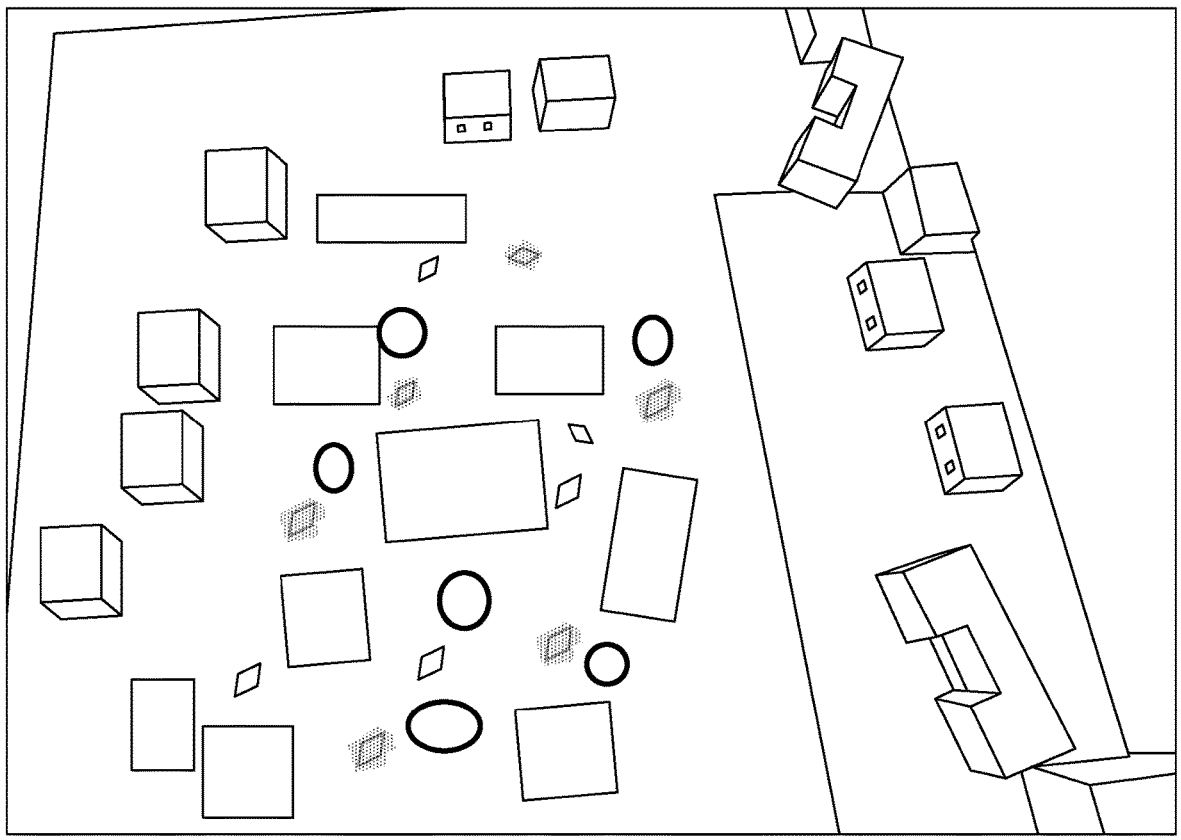
FIG. 15 is a schematic diagram of a candidate region according to an embodiment of this disclosure.

FIG. 15 is a schematic diagram of a candidate region according to an embodiment of this disclosure. Six candidate regions are preset in the virtual scene. When the target region is generated, one of the six candidate regions is randomly selected as the target region.

Step 1402: Determine whether the first virtual object enters the target region. If yes, perform step 1403. Otherwise, repeatedly perform step 1402.

A manner of seizing the target region is to control the virtual object to enter the target region, and make the virtual object stay in the target region for a period of time. When a staying duration reaches a duration threshold, it is determined that the virtual object occupies (controls) the target region. If the staying duration does not reach the staying duration threshold and the virtual object is controlled to actively leave the target region, or if the virtual object is killed by other virtual objects because of seizing the target region, it is determined that the virtual object fails to display the target region.

After the target region is seized by other virtual objects (enemies), in addition to waiting for an effect to be eliminated, it is also possible to seize the target region back, that is, the virtual object is controlled to enter the target region that has been seized by other virtual objects, and stay in the target region for a period of time.

Figure 16:
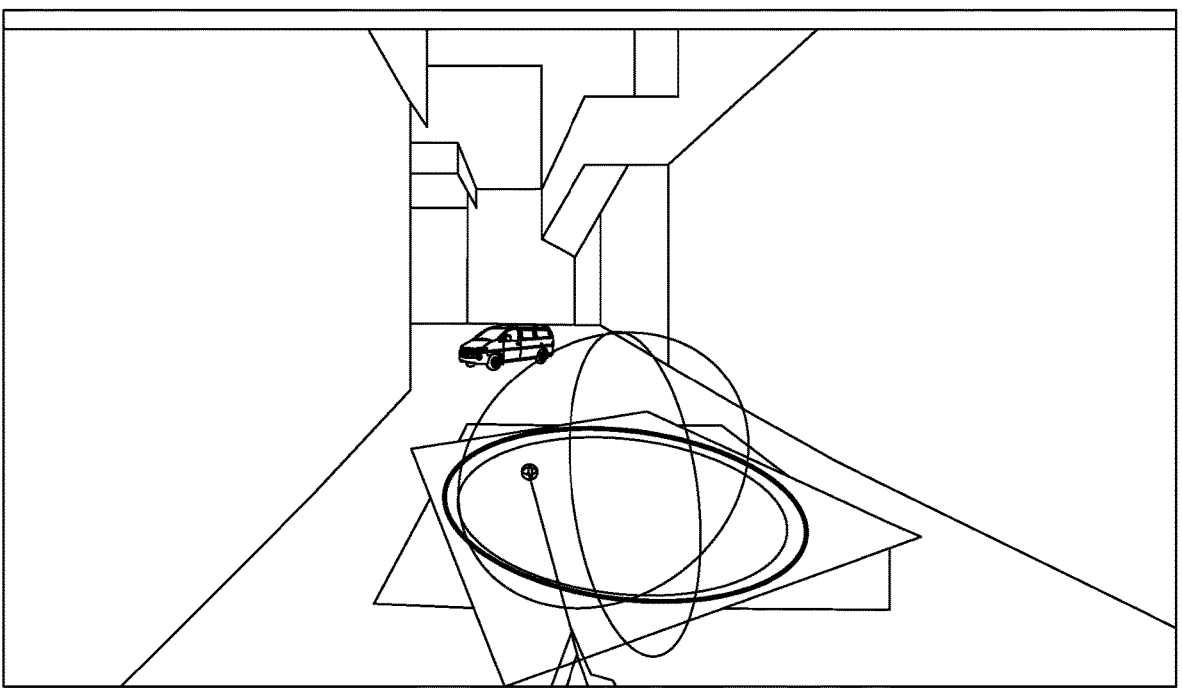
FIG. 16 is a schematic diagram of a target region according to an embodiment of this disclosure.

In actual implementation, the target region is a circular special effect on which a collision box is added. FIG. 16 is a schematic diagram of a target region according to an embodiment of this disclosure. The target region is the circular special effect on which the collision box is added. When the first virtual object approaches the collision box on the special effect, it is determined that the first virtual object enters the target region, and a countdown is triggered.

Step 1403: Start the countdown.

When the target region is not occupied (controlled) by any virtual object, an occupation countdown is displayed. When the countdown ends, prompt information of occupation success is displayed, and the perspective effect is enabled. When the target region has already been occupied (controlled) by a second virtual object (enemy), an anti-occupation countdown is displayed. When the countdown ends, prompt information of anti-occupation success is displayed, and the perspective effect enabled by the enemy is canceled.

Figure 17:
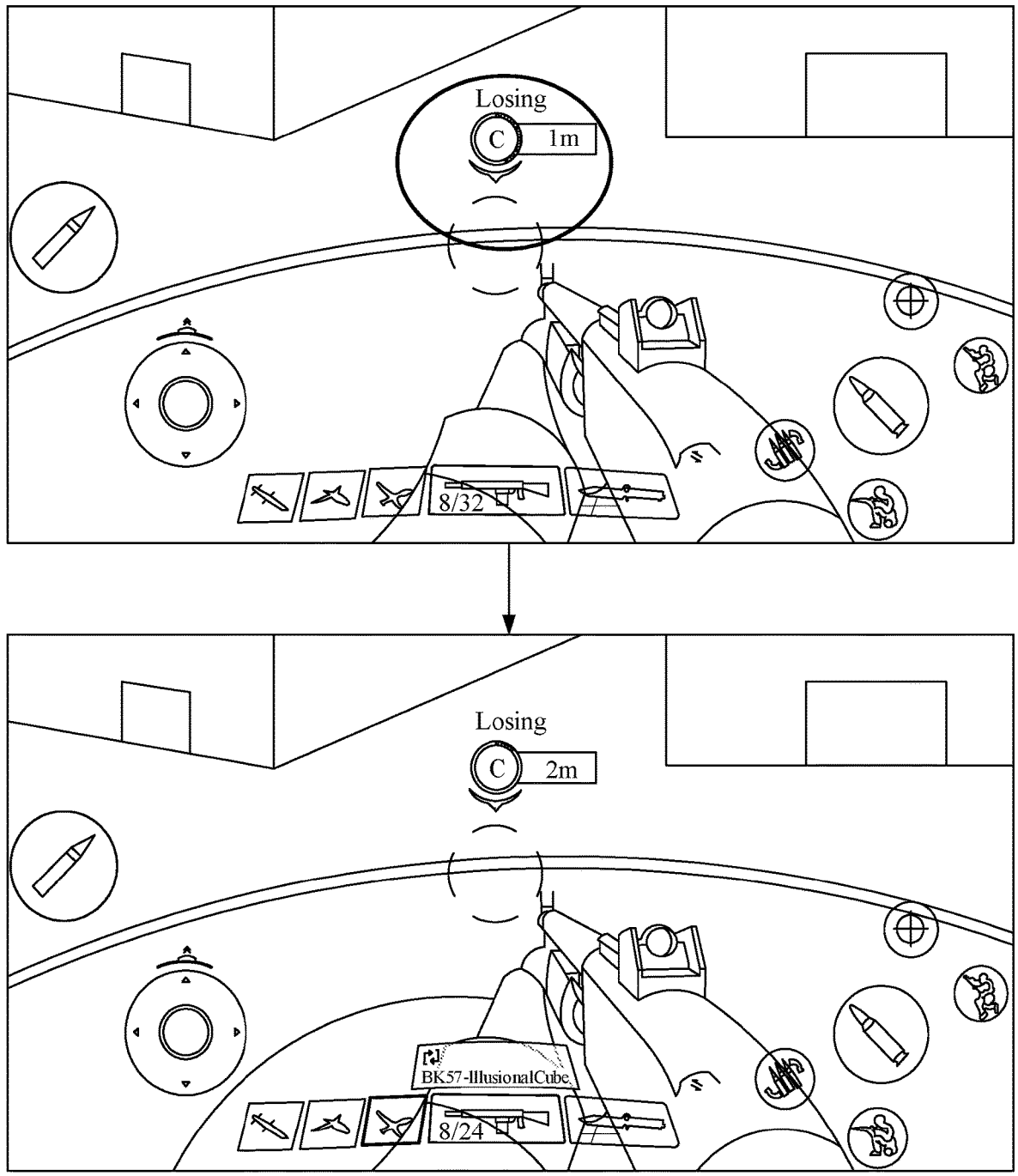
FIG. 17 is a schematic diagram of an interface of anti-occupation according to an embodiment of this disclosure.

Exemplarily, the occupation countdown is performed in the form of the progress bar. Referring to FIG. 6, when the target region is not occupied by any virtual object, prompt information of occupying is displayed, and the occupation countdown is displayed in the form of the progress bar. The progress bar increases as the staying duration of the first virtual object in the target region increases. It is determined that the first virtual object anti-occupies the target region when the progress bar reaches 100%. FIG. 17 is a schematic diagram of an interface of anti-occupation according to an embodiment of this disclosure. When the target region has been occupied by another second virtual object, prompt information of anti-occupying is displayed, and the occupation countdown is displayed in the form of the progress bar. As the staying duration of the first virtual object in the target region increases, the progress bar decreases accordingly. It is determined that the first virtual object anti-occupies the target region when the progress bar reaches 0.

In actual implementation, the target region may be displayed by using a circle in different colors. A region within the circle is the target region, and a color of the circle is used for representing the state information of the target region. For example, white indicates that the target region is not controlled, blue indicates that the target region is controlled by the first virtual object, and red indicates that the target region is controlled by the second virtual object. The first virtual object and the second virtual object may be in a hostile relationship.

Step 1404: Determine whether the countdown ends. If yes, perform step 1405*a* or step 1405*b*. Otherwise, perform step 1403.

When the target region is not occupied by any virtual object, step 1405*a* is performed. When the target region has already been occupied by another virtual object, step 1405*b* is performed.

Step 1405*a*: Display prompt information of occupation success, and enable the perspective effect.

After the first virtual object is successfully occupied, a circle corresponding to the target region is displayed in blue, to inform the user who controls the first virtual object that the target region has been occupied.

Step 1405*b*: Display prompt information of anti-occupation success, and enable the perspective effect. Further, the perspective effect enabled by the enemy may be canceled.

Step 1406: Determine whether the target region is anti-occupied. If yes, perform step 1407. Otherwise, perform step 1408.

Step 1407: Cancel the perspective effect.

Step 1408: Determine whether there is a wall between the first virtual object and the second virtual object. If yes, perform step 1409. Otherwise, perform step 1406.

Because the perspective effect can only be displayed through the wall, it is necessary to determine whether there is an obstacle between the enemy and the player. That is, all the enemies are connected to a local player by lines. A position of the player is regarded as a starting point, a direction of a muzzle is regarded as a direction of radiation detection, a distance is a distance between the enemy and the player, and then the radiation detection is performed. If another item is detected between the enemy and the player, the enemy is blocked by the obstacle.

Referring to FIG. 11, a first virtual object 1101 and three second virtual objects, that is, 1102A, 1102B and 1102C, are included in FIG. 11. A connecting line between the first virtual object and each second virtual object is respectively determined. If the connecting line passes through another item, it indicates that the second virtual object is blocked by the item, and the second virtual object needs to be displayed in a perspective manner.

Step 1409: Display the perspective effect on the wall.

Figure 18:
FIG. 18 is a schematic diagram of an interface for displaying a perspective effect on a wall according to an embodiment of this disclosure.

In actual implementation, an outline of at least one enemy virtual object (second virtual object) is displayed on the wall, to implement the perspective effect. A name corresponding to the second virtual object may further be displayed while the perspective effect is displayed on the wall. FIG. 18 is a schematic diagram of an interface for displaying a perspective effect on a wall according to an embodiment of this disclosure. A perspective human shape in the diagram is a position of the enemy virtual object, and the name is displayed on a head of the virtual object.

The perspective effect is maintained for a period of time, and is automatically canceled when the target duration is reached.

The embodiments of this disclosure can include the following beneficial effects:

A problem that it is difficult to find an enemy because the map is large in the related art is solved. By briefly exposing the position of the enemy or other information through the perspective effect, an interaction frequency in the battle is increased, and a battle is quickly completed.

Figure 19:
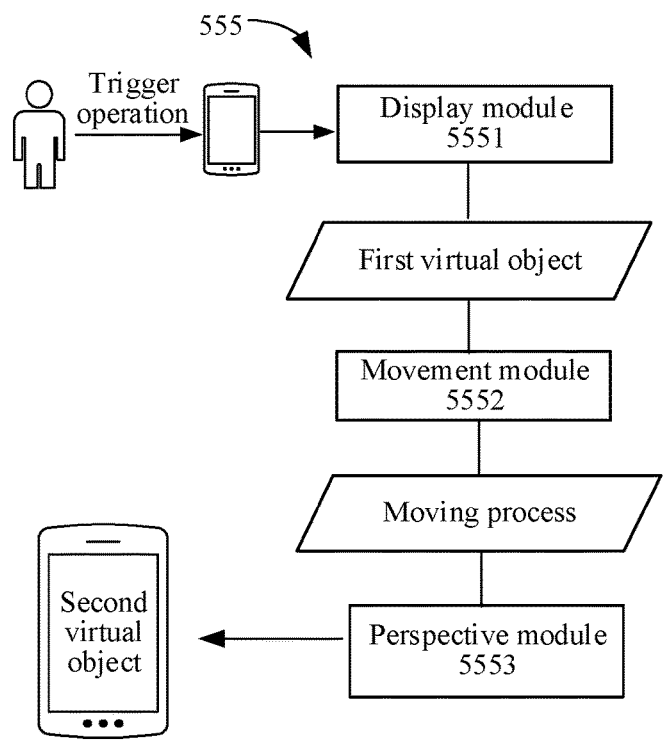
FIG. 19 is a schematic structural composition diagram of an information display apparatus in a virtual scene according to an embodiment of this disclosure.

FIG. 19 is a schematic structural composition diagram of an information display apparatus in a virtual scene according to an embodiment of this disclosure. One or more modules, submodules, and/or units of the apparatus can be implemented by processing circuitry, software, or a combination thereof, for example. An information display apparatus 555 in the virtual scene provided in the embodiments of this disclosure includes a display module 5551, a movement module 5552, and a perspective module 5553.

The display module 5551 is configured to display a first virtual object in a picture of a virtual scene.

The movement module 5552 is configured to control, in response to a movement operation for the first virtual object, the first virtual object to move in the virtual scene.

The perspective module 5553 is configured to display at least one second virtual object blocked by an item in the virtual scene in a perspective manner, when the first virtual object moves to a target region in the virtual scene and obtains a control authority for the target region.

In some embodiments, the movement module is further configured to display a relative position of the first virtual object and the target region in real time; and receive a movement operation for the first virtual object triggered based on the relative position.

In some embodiments, the perspective module is further configured to display a staying duration of the first virtual object in the target region when the first virtual object moves to the target region of the virtual scene; and determine that the first virtual object obtains the control authority for the target region when the staying duration of the first virtual object in the target region reaches a duration threshold.

In some embodiments, the perspective module is further configured to display a staying duration of the first virtual object in the target region and a health point of the first virtual object; and determine that the first virtual object obtains the control authority for the target region when the staying duration of the first virtual object in the target region reaches a duration threshold and the health point of the first virtual object is higher than a health point threshold.

In some embodiments, the perspective module is further configured to display a quantity of second virtual objects killed by the first virtual object; and determine that the first virtual object obtains the control authority for the target region when the quantity of second virtual objects killed by the first virtual object reaches a quantity threshold.

In some embodiments, the display module is further configured to randomly select at least one candidate region from pre-configured at least two candidate regions as the target region; and display a map thumbnail corresponding to the virtual scene, and display position information of the target region in the map thumbnail.

In some embodiments, the display module is further configured to display the target region, and state information of the target region.

The state information is used for indicating a controlled state of the target region, and a corresponding control object when the target region is controlled.

In some embodiments, the perspective module is further configured to display an outline of the second virtual object blocked by the item on a surface of the item in the virtual scene.

In some embodiments, the perspective module is further configured to display the item in the virtual scene with target transparency, and display the at least one second virtual object through the item.

In some embodiments, the perspective module is further configured to display identification information of the at least one second virtual object, and a distance between each second virtual object and the first virtual object.

In some embodiments, the perspective module is further configured to determine a connecting line between the first virtual object and each second virtual object; and determine, when the connecting line passes through at least one item, that a corresponding second virtual object is blocked by the item.

In some embodiments, the perspective module is further configured to cancel the display of the at least one second virtual object blocked by the item in the virtual scene in a perspective manner, when the second virtual object moves to a target region in the virtual scene and obtains the control authority for the target region.

An embodiment of this disclosure provides a computer program product or a computer program. The computer program product or the computer program includes a computer instruction. The computer instruction is stored in a computer-readable storage medium. A processor of a computer device reads the computer instructions from the computer-readable storage medium. The processor executes the computer instructions, to cause the computer device to perform the information display method in a virtual scene of the embodiments of this disclosure.

An embodiment of this disclosure provides a computer-readable storage medium, such as a non-transitory computer-readable storage medium, storing executable instructions, the executable instructions, when executed by a processor, causing the processor to perform the method, for example, the method as shown in FIG. 3 provided in the embodiments of this disclosure.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or more modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this disclosure and are not intended to limit the scope of this disclosure. Any modification, equivalent replacement, or improvement made without departing from the spirit and range of this disclosure shall fall within the scope of this disclosure.

What is claimed is:

1. An information display method in a virtual scene, the method comprising:

displaying the virtual scene that includes a first virtual object;

controlling the first virtual object to move in the virtual scene based on a user input; and in response to the first virtual object moving into a target region in the virtual scene and obtaining control authority of the target region, displaying by processing circuitry a graphical representation of each of at least one second virtual object in the virtual scene based on a perspective of the first virtual object in the virtual scene, wherein, when a view of the respective second virtual object from a location of the first virtual object is obstructed, the graphical representation of an obstructed portion of the respective second virtual object is displayed in the virtual scene based on the perspective of the first virtual object and a position of the respective second virtual object in the virtual scene.

2. The method according to claim 1, wherein the graphical representation of each of the at least one second virtual object includes a silhouette of the obstructed portion of the respective second virtual object, the view of the respective second virtual object from the location of the first virtual object being obstructed by one or more walls in the virtual scene.

3. The method according to claim 1, further comprising:
displaying a relative position between the first virtual object and the target region in real time.

4. The method according to claim 1, further comprising:
displaying an occupancy duration of the first virtual object in the target region when the first virtual object moves into the target region of the virtual scene; and
determining that the first virtual object obtains the control authority of the target region based on a determination that the occupancy duration of the first virtual object in the target region reaches a duration threshold.

5. The method according to claim 1, further comprising:
displaying an occupancy duration of the first virtual object in the target region and a health status of the first virtual object; and
determining that the first virtual object obtains the control authority for the target region based on a determination that the occupancy duration of the first virtual object in the target region reaches a duration threshold and the health status of the first virtual object is higher than a minimum health threshold.

6. The method according to claim 1, further comprising:
displaying a quantity of second virtual objects killed by the first virtual object; and
determining that the first virtual object obtains the control authority for the target region based on a determination that the quantity of second virtual objects killed by the first virtual object reaches a quantity threshold.

7. The method according to claim 1, further comprising:
randomly selecting the target region from at least two candidate regions;
displaying a map corresponding to the virtual scene; and
displaying position information of the target region in the map.

8. The method according to claim 1, further comprising:
displaying the target region, and state information of the target region,
the state information indicating a controlled state of the target region, and a corresponding control object when the target region is controlled.

9. The method according to claim 1, wherein the displaying the graphical representation of each of the at least one second virtual object comprises:
displaying an outline of the respective second virtual object that is obstructed by an item in the virtual scene on a surface of the item.

10. The method according to claim 1, wherein the displaying the graphical representation of each of the at least one second virtual object comprises:
displaying an item in the virtual scene that obstructs the view of the respective second virtual object with a target transparency; and
displaying the respective second virtual object through the item.

11. The method according to claim 1, further comprising:
displaying identification information of the at least one second virtual object, and a distance between each of the at least one second virtual object and the first virtual object.

12. The method according to claim 1, further comprising:
canceling the display of the graphical representation of each of the at least one second virtual object when the control authority of the target region is obtained by another virtual object.

13. The method according to claim 1, further comprising:
determining a connecting line between the first virtual object and each of the least one second virtual object; and
determining, when the connecting line passes through at least one item, that a corresponding second virtual object is obstructed by the at least one item.

14. An information display apparatus, comprising:
processing circuitry configured to:
display a virtual scene that includes a first virtual object;
control the first virtual object to move in the virtual scene based on a user input; and
in response to the first virtual object moving into a target region in the virtual scene and obtaining control authority of the target region, display a graphical representation of each of at least one second virtual object in the virtual scene based on a perspective of the first virtual object in the virtual scene,
wherein, when a view of the respective second virtual object from a location of the first virtual object is obstructed, the graphical representation of an obstructed portion of the respective second virtual object is displayed in the virtual scene based on the perspective of the first virtual object and a position of the respective second virtual object in the virtual scene.

15. The information display apparatus according to claim 14, wherein the graphical representation of each of the at least one second virtual object includes a silhouette of the obstructed portion of the respective second virtual object, the view of the respective second virtual object from the location of the first virtual object being obstructed by one or more walls in the virtual scene.

16. The information display apparatus according to claim 14, wherein the processing circuitry is configured to:
display a relative position between the first virtual object and the target region in real time.

17. The information display apparatus according to claim 14, wherein the processing circuitry is configured to:
- display an occupancy duration of the first virtual object in the target region when the first virtual object moves into the target region of the virtual scene; and
- determine that the first virtual object obtains the control authority of the target region based on a determination that the occupancy duration of the first virtual object in the target region reaches a duration threshold.

18. The information display apparatus according to claim 14, wherein the processing circuitry is configured to:
- display an occupancy duration of the first virtual object in the target region and a health status of the first virtual object; and
- determine that the first virtual object obtains the control authority for the target region based on a determination that the occupancy duration of the first virtual object in the target region reaches a duration threshold and the health status of the first virtual object is higher than a minimum health threshold.

19. The information display apparatus according to claim 14, wherein the processing circuitry is configured to:
- display a quantity of second virtual objects killed by the first virtual object; and
- determine that the first virtual object obtains the control authority for the target region based on a determination that the quantity of second virtual objects killed by the first virtual object reaches a quantity threshold.

20. A non-transitory computer-readable storage medium storing instructions which when executed by a processor cause the processor to perform:
- displaying a virtual scene that includes a first virtual object;
- controlling the first virtual object to move in the virtual scene based on a user input; and
- in response to the first virtual object moving into a target region in the virtual scene and obtaining control authority of the target region, displaying a graphical representation of each of at least one second virtual object in the virtual scene based on a perspective of the first virtual object in the virtual scene,
- wherein, when a view of the respective second virtual object from a location of the first virtual object is obstructed, the graphical representation of an obstructed portion of the respective second virtual object is displayed in the virtual scene based on the perspective of the first virtual object and a position of the respective second virtual object in the virtual scene.

\* \* \* \* \*